US010089772B2

(12) United States Patent
Taylor et al.

(10) Patent No.: US 10,089,772 B2
(45) Date of Patent: Oct. 2, 2018

(54) CONTEXT-AWARE DIGITAL PLAY

(71) Applicant: Hasbro, Inc., Pawtucket, MA (US)

(72) Inventors: Benjamin Parry Taylor, Quincy, MA (US); William George Gajda, Jr., Cranston, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 15/136,235

(22) Filed: Apr. 22, 2016

(65) Prior Publication Data
US 2016/0314609 A1   Oct. 27, 2016

Related U.S. Application Data

(60) Provisional application No. 62/151,732, filed on Apr. 23, 2015.

(51) Int. Cl.
*G06T 13/40* (2011.01)
*A63F 13/65* (2014.01)
(Continued)

(52) U.S. Cl.
CPC ............ *G06T 13/40* (2013.01); *A63F 13/213* (2014.09); *A63F 13/235* (2014.09); *A63F 13/58* (2014.09);
(Continued)

(58) Field of Classification Search
None
See application file for complete search history.

(56) References Cited

U.S. PATENT DOCUMENTS 4,884,972 A   12/1989  Gasper
5,416,899 A    5/1995  Poggio et al.
(Continued)

FOREIGN PATENT DOCUMENTS

EP         1670165 A2    6/2006
WO      WO2002037471     5/2002
(Continued)

OTHER PUBLICATIONS

The Super Scoop on the Bratz Action Heroez App!, Aug. 4, 2013, https://bratzboulevard.wordpress.com/2013/08/04/the-super-scoop-on-the-bratz-action-heroez-app/, 10 pages.
(Continued)

*Primary Examiner* — Vu Nguyen
(74) *Attorney, Agent, or Firm* — DiBerardino McGovern IP Group LLC

(57) ABSTRACT

Context-aware digital play includes accessing a virtual scene, the virtual scene comprising digital content; determining that the digital content of the virtual scene comprises a representation of at least one of a plurality of characters, each of the characters being associated with rules; accessing an indication of one or more context-based stimuli, the context-based stimuli being based on the virtual scene; determining whether one or more rules associated with the character and the one or more context-based stimuli associated with the accessed indications exist; and if one or more rules are determined to exist, applying the context-based stimuli to the virtual scene by updating digital content of the virtual scene based on the one or more rules and modifying the representation of the character based on the one or more rules.

33 Claims, 16 Drawing Sheets

Figure 1:
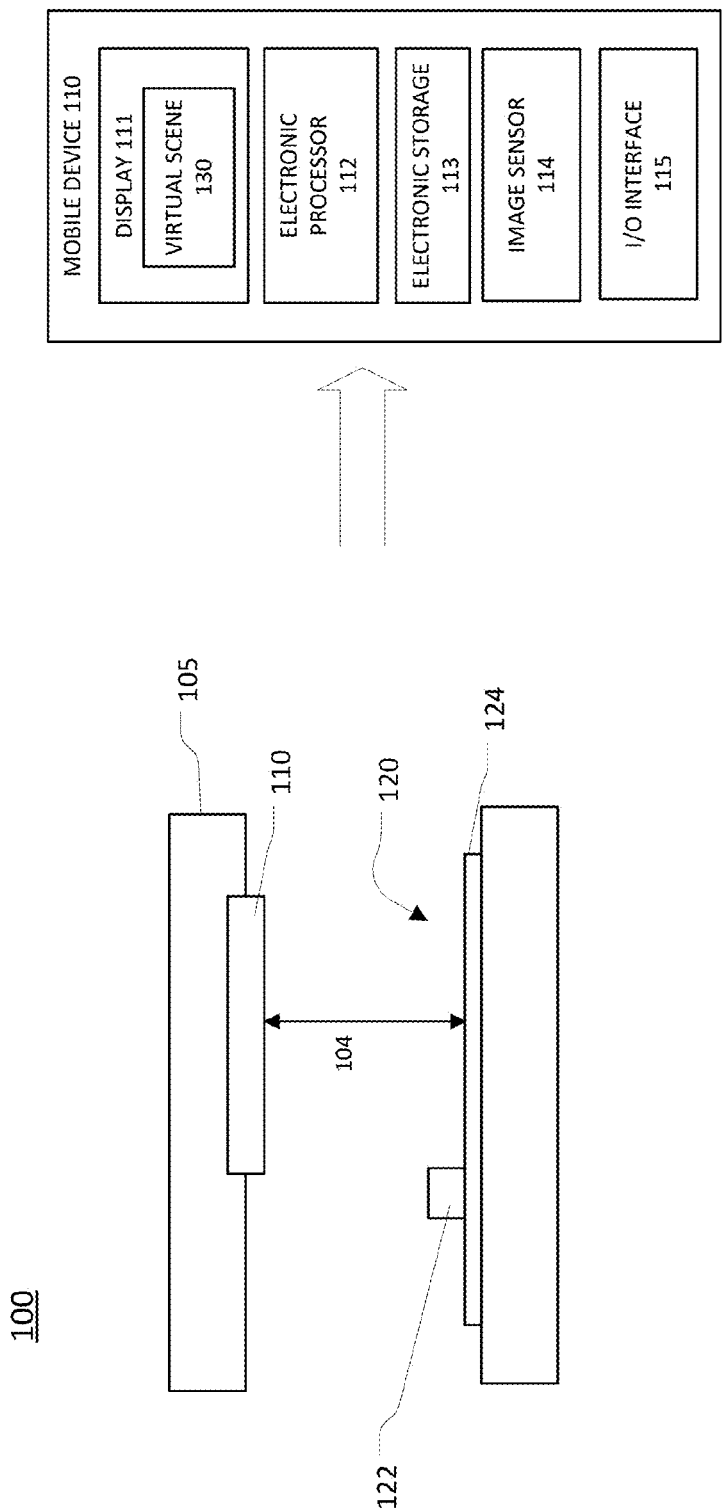

(51) Int. Cl.
*A63F 13/213* (2014.01)
*A63F 13/235* (2014.01)
*A63F 13/58* (2014.01)
*A63F 13/30* (2014.01)

(52) U.S. Cl.
CPC ............. *A63F 13/65* (2014.09); *A63F 13/30* (2014.09); *A63H 2200/00* (2013.01); *G06T 2213/12* (2013.01)

(56) References Cited

U.S. PATENT DOCUMENTS

| | | |
|---|---|---|
| 5,692,117 A | 11/1997 | Berend et al. |
| 5,717,848 A | 2/1998 | Watanabe et al. |
| 5,746,602 A | 5/1998 | Kikinis |
| 5,752,880 A | 5/1998 | Gabai et al. |
| 5,818,461 A | 10/1998 | Rouet et al. |
| 5,940,538 A | 8/1999 | Spiegel et al. |
| 6,022,273 A | 2/2000 | Gabai et al. |
| 6,075,195 A | 6/2000 | Gabai et al. |
| 6,149,490 A | 11/2000 | Hampton et al. |
| 6,160,986 A | 12/2000 | Gabai et al. |
| 6,206,745 B1 | 3/2001 | Gabai et al. |
| 6,259,815 B1 | 7/2001 | Anderson et al. |
| 6,263,091 B1 | 7/2001 | Jain et al. |
| 6,290,566 B1 | 9/2001 | Gabai et al. |
| 6,319,010 B1 | 11/2001 | Kikinis |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,514,117 B1 | 2/2003 | Hampton et al. |
| 6,544,098 B1 | 4/2003 | Hampton et al. |
| 6,562,163 B1 | 5/2003 | Wellington |
| 6,586,074 B1 | 7/2003 | Lee et al. |
| 6,690,156 B1 | 2/2004 | Weiner et al. |
| 6,761,634 B1 | 7/2004 | Peterson et al. |
| 6,766,036 B1 | 7/2004 | Pryor |
| 6,773,322 B2 | 8/2004 | Gabai et al. |
| 6,773,344 B1 | 8/2004 | Gabai et al. |
| 6,959,166 B1 | 10/2005 | Gabai et al. |
| 7,037,455 B2 | 5/2006 | Marine |
| 7,081,033 B1 | 7/2006 | Mawle et al. |
| 7,295,220 B2 | 11/2007 | Zhou et al. |
| 7,348,963 B2 | 3/2008 | Bell |
| 7,358,962 B2 | 4/2008 | Dehlin et al. |
| 7,416,468 B1 | 8/2008 | Felice et al. |
| 7,431,629 B1 | 10/2008 | Maddocks et al. |
| 7,736,568 B2 | 6/2010 | Chan |
| 7,743,330 B1 | 6/2010 | Hendricks et al. |
| 7,899,206 B2 | 3/2011 | Horovitz et al. |
| 7,901,265 B1 | 3/2011 | Cameron et al. |
| 7,911,503 B2 | 3/2011 | Kobayashi |
| 7,967,513 B2 | 6/2011 | Zhang |
| 7,991,220 B2 | 8/2011 | Nagai et al. |
| 8,121,618 B2 | 2/2012 | Rhoads et al. |
| 8,126,264 B2 | 2/2012 | Kaftory et al. |
| 8,130,244 B2 | 3/2012 | Cooper |
| 8,210,945 B2 | 7/2012 | Horovitz |
| 8,279,168 B2 | 10/2012 | Glomski et al. |
| 8,287,372 B2 | 10/2012 | Hong et al. |
| 8,368,795 B2 | 2/2013 | Lo et al. |
| 8,422,994 B2 | 4/2013 | Rhoads et al. |
| 8,509,483 B2 | 8/2013 | Lawrence Ashok Inigo |
| 8,549,418 B2 | 10/2013 | Lamarca et al. |
| 8,606,000 B2 | 12/2013 | Horovitz et al. |
| 8,611,587 B2 | 12/2013 | Horovitz |
| 8,615,471 B2 | 12/2013 | Hannigan et al. |
| 8,638,364 B2 | 1/2014 | Chen et al. |
| 8,814,048 B2 | 8/2014 | Taylor |
| 8,831,279 B2 | 9/2014 | Rodriguez et al. |
| 8,834,228 B2 | 9/2014 | Marine |
| 8,842,096 B2 | 9/2014 | Nungester et al. |
| 8,855,366 B2 | 10/2014 | Wagner et al. |
| 9,028,315 B2 | 5/2015 | Morichau-Beauchant et al. |
| 9,060,108 B1 | 6/2015 | Kuffner |
| 9,154,677 B2 | 10/2015 | Merz |
| 9,158,389 B1 | 10/2015 | Sharma et al. |
| 9,305,399 B2 | 4/2016 | Morinaga et al. |
| 9,354,716 B1 | 5/2016 | Sharma et al. |
| 9,555,337 B2 | 1/2017 | Garlington et al. |
| 9,582,083 B2 | 2/2017 | Yin |
| 9,626,591 B2 | 4/2017 | Holz |
| 9,733,790 B2 | 8/2017 | Sumner et al. |
| 2005/0250415 A1 | 11/2005 | Barthold |
| 2005/0275635 A1 | 12/2005 | Dehlin et al. |
| 2005/0288078 A1 | 12/2005 | Cheok et al. |
| 2007/0101383 A1 | 5/2007 | MacIntosh et al. |
| 2009/0036218 A1 | 2/2009 | Andersen |
| 2009/0068923 A1 | 3/2009 | Cheng |
| 2010/0328420 A1 | 12/2010 | Roman |
| 2011/0028219 A1 | 2/2011 | Heatherly et al. |
| 2011/0081946 A1 | 4/2011 | Singh |
| 2011/0118032 A1 | 5/2011 | Zalewski |
| 2011/0316767 A1 | 12/2011 | Avrahami |
| 2012/0146998 A1 | 6/2012 | Kim et al. |
| 2012/0243732 A1 | 9/2012 | Swaminathan et al. |
| 2012/0256917 A1 | 10/2012 | Lieberman et al. |
| 2012/0295703 A1 | 11/2012 | Reiche et al. |
| 2013/0123009 A1 | 5/2013 | Maharbiz et al. |
| 2013/0215148 A1 | 8/2013 | Antonyuk et al. |
| 2013/0342570 A1 | 12/2013 | Kinnebrew et al. |
| 2014/0028712 A1 | 1/2014 | Keating et al. |
| 2014/0085265 A1 | 3/2014 | Yin |
| 2014/0098991 A1 | 4/2014 | Yang |
| 2014/0104274 A1 | 4/2014 | Hilliges et al. |
| 2014/0139668 A1 | 5/2014 | Short |
| 2014/0184644 A1 | 7/2014 | Sharma et al. |
| 2014/0267770 A1 | 9/2014 | Gervautz et al. |
| 2014/0273717 A1 | 9/2014 | Judkins et al. |
| 2014/0293045 A1 | 10/2014 | Horovitz et al. |
| 2014/0329598 A1 | 11/2014 | Horovitz et al. |
| 2014/0344762 A1 | 11/2014 | Grasset et al. |
| 2014/0369550 A1 | 12/2014 | Davis et al. |
| 2014/0378022 A1 | 12/2014 | Muthyala et al. |
| 2015/0042663 A1 | 2/2015 | Mandel et al. |
| 2015/0163345 A1 | 6/2015 | Cornaby et al. |
| 2015/0202541 A1 | 7/2015 | Oh |
| 2015/0209664 A1* | 7/2015 | Haseltine ................ A63F 13/00 463/31 |
| 2015/0235088 A1 | 8/2015 | Abovitz et al. |
| 2015/0302652 A1* | 10/2015 | Miller .................... G06F 3/011 345/419 |
| 2015/0375115 A1 | 12/2015 | Bunting et al. |
| 2016/0189397 A1 | 6/2016 | Mullins et al. |
| 2016/0274705 A1 | 9/2016 | Kapadia et al. |

FOREIGN PATENT DOCUMENTS

| | | |
|---|---|---|
| WO | WO2015185629 A2 | 12/2015 |
| WO | WO2016050757 A1 | 4/2016 |

OTHER PUBLICATIONS

State diagram, Wikipedia, the free encyclopedia, https://en.wikipedia.org/wiki/State_diagram, last modified on Mar. 13, 2016, 5 pages.
SimCity, Wikipedia, the free encyclopedia, https://en.wikipedia.org/wiki/SimCity, last modified on Mar. 2, 2016, 11 pages.
Overhead projector, Wikipedia, the free encyclopedia, https://en.wikipedia.org/wiki/Overhead_projector, last modified on Feb. 28, 2016, 4 pages.
O'Connell, "Osmo Brings a Software Sleight-of-Hand to Traditional Toys," Fast Company & Inc., 2015, http://www.fastcompany.com/3031019/osmo-brings-a-software-sleight-of-hand-to-traditional-toys, 4 pages.
Lew, "Making City Planning a Game," Jun. 15, 1989, Home & Garden, The New York Times, http://www.nytimes.com/1989/06/15/garden/making-city-planning-a-game, 2 pages.
Sawant, "HP Sprout PC housing an overhead projector along with Intel RealSense 3D camera launched," http://tech.firstpost.com/news-analysis/hp-sprout-pc-housing-an-overhead-projector-along-with-intel-realsense-3d-camera-launched-239541.html, Oct. 30, 2014, 5 pages.

(56) References Cited

OTHER PUBLICATIONS

Hoffman, "Ensemble: Fluency and Embodiment for Robots Acting with Humans," Massachusetts Institute of Technology, Sep. 2007, pp. 23-29 (entire document is 234 pages).
He et al., "Delving Deep into Rectifiers: Surpassing Human-Level Performance on ImageNet Classification," Microsoft Research, Feb. 6, 2015, 11 pages.
Maiberg, "Google and Toy Maker Mattel Reveal Virtual Reality "View-Master"," GameSpot, Feb. 14, 2015, 7 pages.
Zhang et al., "Fruit classification using computer vision and feedforward neural network," ResearchGate, Journal of Food Engineering 143 (2014), pp. 167-177 (12 total pages).
Launchpad Toys—Creators of Toontastic & TeleStory, educational apps for the iPad and iPhone, http://launchpadtoys.com/, printed on Apr. 18, 2016, 7 pages.
International Search Report and Written Opinion, counterpart PCT Application No. PCT/US2016/028881, dated Sep. 6, 2016, 21 pages total.
Balloon paperApp on Vimeo, 2 pages, printed on Aug. 31, 2017, https://vimeo.com/35751220.
Minecraft Stop-Motion Movie Creator Kit | CMH76 | Mattel Shop, 14 pages, printed on Aug. 2, 2017, http://shop.mattel.com/shop/en-us/ms/minecraft-toys/minecraft-stop-motion-movie-creator-kit-cmh76.
Puzzlets—Award-Winning EdTech Product from Digital Dream Labs, 8 pages, printed on Aug. 2, 2017, http://www.digitaldreamlabs.com/.

\* cited by examiner

CONTEXT-AWARE DIGITAL PLAY

CROSS-REFERENCE TO RELATED APPLICATION

This application claims the benefit of U.S. Provisional Application No. 62/151,732, filed on Apr. 23, 2015 and titled CONTEXT-AWARE DIGITAL PLAY, which is incorporated herein by reference in its entirety.

TECHNICAL FIELD

This disclosure relates to context-aware digital play.

BACKGROUND

Persons of all ages enjoy playing and interacting with toys and building elements.

SUMMARY

The disclosed techniques allow character to be brought into a virtual or digital world through any input mechanism. The disclosed techniques also relate to context-aware rules that allow characters to demonstrate interactions in the virtual world that are consistent with what a human user of a toy system would expect, regardless of whether the user provides input into the toy system.

In one general aspect, context-aware digital play includes accessing a virtual scene, the virtual scene including digital content; determining that the digital content of the virtual scene including a representation of at least one of a plurality of characters, each of the characters being associated with rules; accessing an indication of one or more context-based stimuli, the context-based stimuli being based on the virtual scene; determining whether one or more rules associated with the character and the one or more context-based stimuli associated with the accessed indications exist; and if one or more rules are determined to exist, applying the context-based stimuli to the virtual scene by updating digital content of the virtual scene based on the one or more rules and modifying the representation of the character based on the one or more rules.

Implementations may include one or more of the following features. Modifying the representation of the character based on the one or more rules may include causing the character to perform an action defined by at least one of the one or more rules. Causing the character to perform an action defined by at least one of the one or more rules may include visually presenting the modified representation of the character on a screen of an electronic device, the modified representation having a perceivable distinction from the representation of the character. The modified representation of the character may include an animation of the character that changes visually over time.

In some implementations, a command signal based on the modified representation of the character is generated, the command signal being sufficient to cause a perceivable change in a physical object, and the command signal is provided to the physical object such that the physical object performs a perceivable action determined by the command signal. The perceivable action may include one or more of motion, production of sound, and a change in color.

The virtual scene also may include a representation of at least one object, and a location of the character relative to any of the objects in the virtual scene may be determined from the digital content.

The indication of one or more context-based stimuli may include an indication of one or more of an elapsed time, a distance between the character and an object in the virtual scene, and accessing an indication of the context-based stimuli may include receiving an indication of the context-based stimuli. The indication of the context-based stimuli is received from an electronic system that performs the method for context-aware digital play.

In some implementations, a first physical object may be detected, the first detected physical object may be identified as a first character of the plurality of characters; a second physical object may be detected; and the second physical object may be identified as a second character of the plurality of characters, where determining that the digital content of the virtual scene includes a representation of at least one of the characters includes determining that the digital content of the virtual scene includes a representation of the first character and the second character, and accessing an indication of one or more context-based stimuli includes determining a distance between the first physical character and the second physical character from the representation of the first physical object and the representation of the second physical object, and comparing the determined distance to a threshold. A command signal may be based on the comparison; and the command signal may be provided to one or more of the first physical object and the second physical object, the command signal being sufficient to cause either or both of the first physical object and the second physical object to perform an action defined by the command signal. Threshold may be a value that is associated with one or more of the first particular character and the second particular character. The first and second characters may be different types of characters. The first and second characters may be two instances of the same type of character. At least one of the first physical object and the second physical object is an animatronic toy.

In some implementations, an input may be received from an external source, and if one or more rules are determined to exist, the virtual scene is updated based on the one or more rules and the input from the external source. The input from an external source includes one of more of an indication of a position, a location, a time of year, a time of day, a day of the week, an indication of a presence of a physical prop in a physical play space, and electronic content.

A physical object may be detected, and the physical object may be identified as a particular object, where the digital content of the virtual scene is based on the identified physical object.

In another general aspect, a toy system includes a physical toy including a first communications interface, and a context system. The context system includes a second communications interface configured to receive information related to the toy from the first communications interface; and a controller coupled to the second communications interface, the controller configured to: identify the toy based on the received information, identify a character associated with the toy, access an indication of one or more context-based stimuli, determine whether one or more rules associated with the character and the one or more context-based stimuli associated with the accessed indications exist, if one or more rules are determined to exist, generate a command signal based on the one or more rules, and provide the command signal to the first communications interface of the toy, the command signal being sufficient to cause a perceivable change to the physical toy.

In one general aspect, a method for context-aware digital play includes accessing, at a mobile device positioned relative to a real-world scene, a virtual scene based on the real-world scene, the virtual scene including a first virtual object and a second virtual object; determining, at the mobile device and based on the accessed virtual scene, that the first virtual object and the second virtual object interact; retrieving an attribute associated with the accessed virtual scene from a database stored on a computer-readable medium of the mobile device; selecting, from a range of possible modifications stored in the database, a modification of the first virtual object, the selected modification being associated with the retrieved attribute in the database; applying, at the mobile device, the selected modification to the first virtual object to form a modified first virtual object; and presenting, at the mobile device, an updated virtual scene, the updated virtual scene including the modified first virtual object.

Implementations may include one or more of the following features. The updated virtual scene may be visually presented at the mobile device.

Determining that the first virtual object and the second virtual object interact may include determining whether any part of the first virtual object and the second virtual object coincide spatially. The first virtual object and the second virtual object may include, respectively, a first collision boundary and a second collision boundary, the first and second collision boundary defining first and second collision regions, respectively, and determining whether any part of the first virtual object and the second virtual object coincide spatially may include determining whether the first and second collision regions spatially coincide. The first collision region may be a spatial region that is concentric with the first virtual object and the second collision region may be concentric with the second virtual object.

The attribute associated with the accessed virtual scene may be an attribute that describes a characteristic of an instance of the virtual scene generated prior to the accessed virtual scene.

The attribute associated with the accessed virtual scene may be a plurality of attributes, at least one attribute describing a characteristic of an instance of the virtual scene generated prior to the accessed scene and at least one attribute describing a characteristic of the accessed virtual scene.

The attribute associated with the virtual scene may be an attribute associated with one or more of the first virtual object and the second virtual object.

The attribute associated with the accessed virtual scene may be a position of the first virtual object in the accessed virtual scene relative to a position of the first virtual object in an instance of the virtual scene generated prior to the accessed virtual scene.

The range of modifications stored in the database may include at least one modification that, when applied to the first virtual object, causes the first virtual object to be modified such that, when visually presented, the modified first virtual object is visually distinct from the first virtual object.

The range modifications stored in the database may include at least one idle modification that, when applied to the first virtual object, causes the first virtual object to be unchanged such that, when visually presented, the modified first virtual object is not visually distinct from the first virtual object.

The first virtual object may be associated with a real-world object in the real-world scene, and the attribute associated with the accessed virtual scene may be a characteristic of the real-world object associated with the first virtual object.

Data representing the real-world scene may be received from a sensor, and the accessed virtual scene may be modified based on the data from the sensor. Data representing the real-world scene may be received from a sensor, and the data representing the real-world scene from the sensor may be stored in the database. The sensor may be a camera at the mobile device.

The first virtual object may be a digital representation based on a real-world object in the real-world scene imaged by the camera.

The database may include a range of modifications for a plurality of attributes for each of a plurality of pre-defined virtual objects, one or more of the pre-defined virtual objects being associated with a pre-defined real-world object.

In another general aspect, a system for context-aware digital play includes a stand including: a holder configured to receive and hold a mobile device, the holder including a movable portion; a base configured to receive a toy; a pedestal configured to support the holder at a distance from the base; and an optical assembly including more than one optical element, the optical elements arranged to center a field of view of an imaging sensor of the mobile device at a center of the base when the mobile device is in the holder.

The optical assembly may be movable relative to the base.

Implementations of any of the techniques described above may include a toy system, a method, a device, a toy, or instructions stored on a computer-readable medium. The details of one or more implementations are set forth in the accompanying drawings and the description below. Other features will be apparent from the description and drawings, and from the claims.

DRAWING DESCRIPTION

Figure 2:
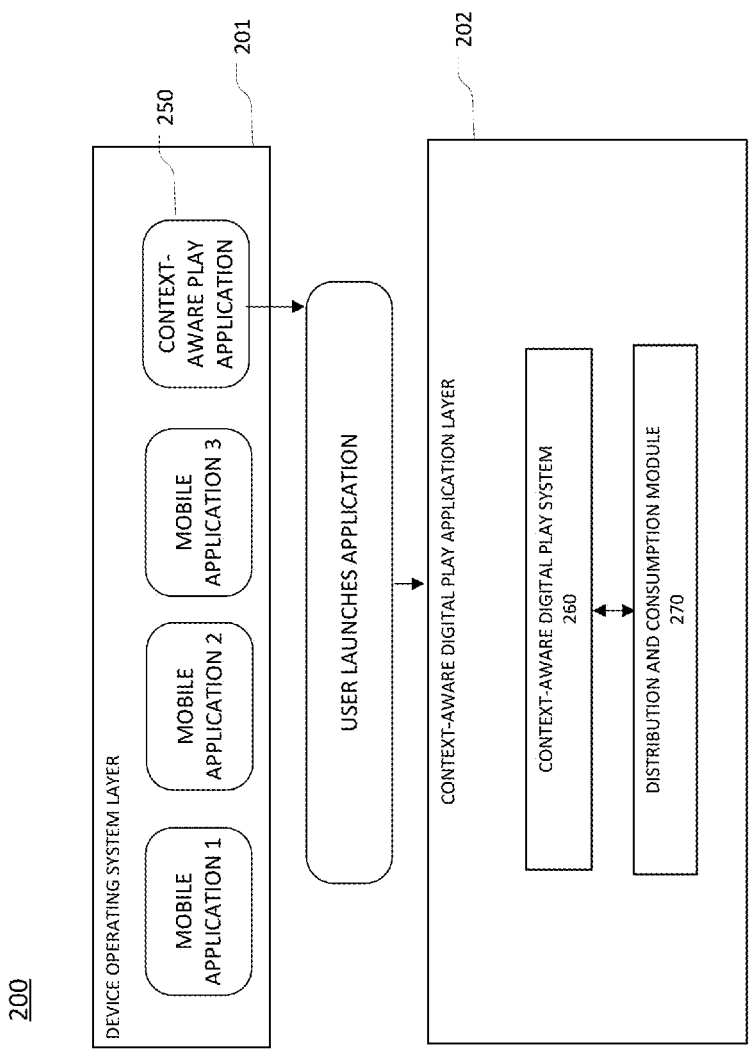
Figure 5:
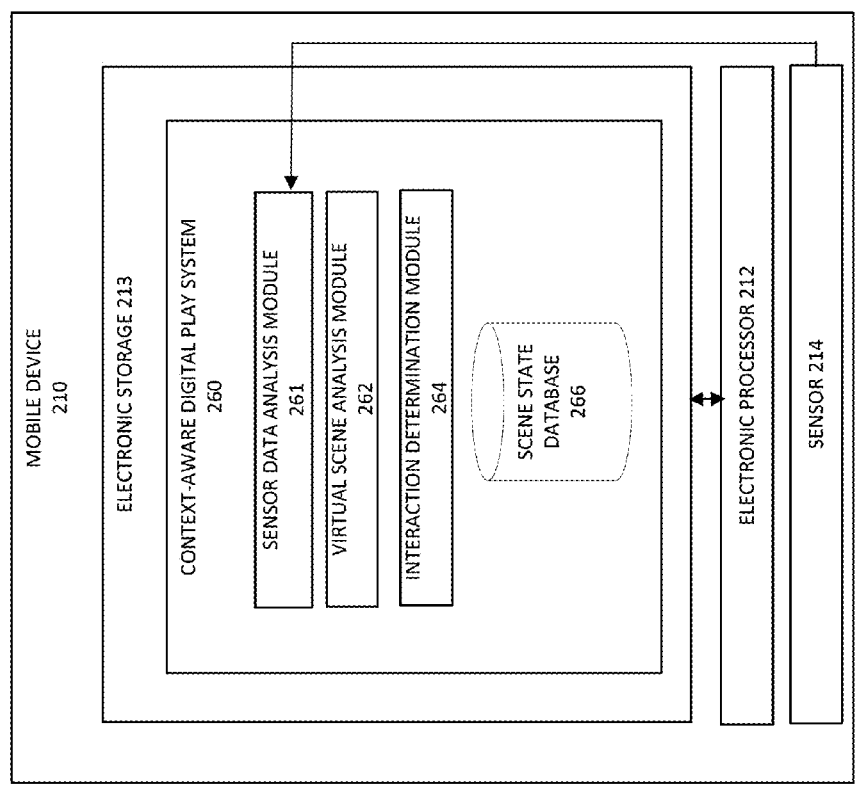
Figure 6:
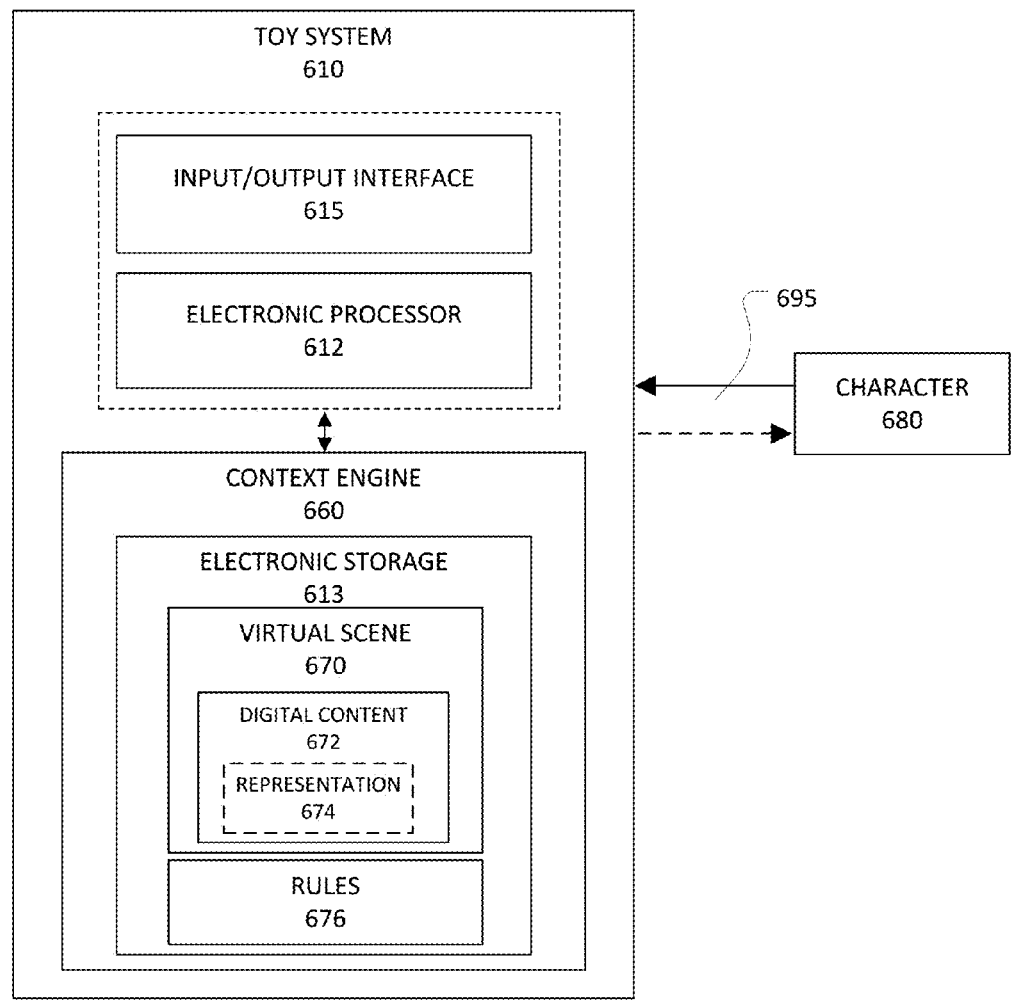
Figure 7:
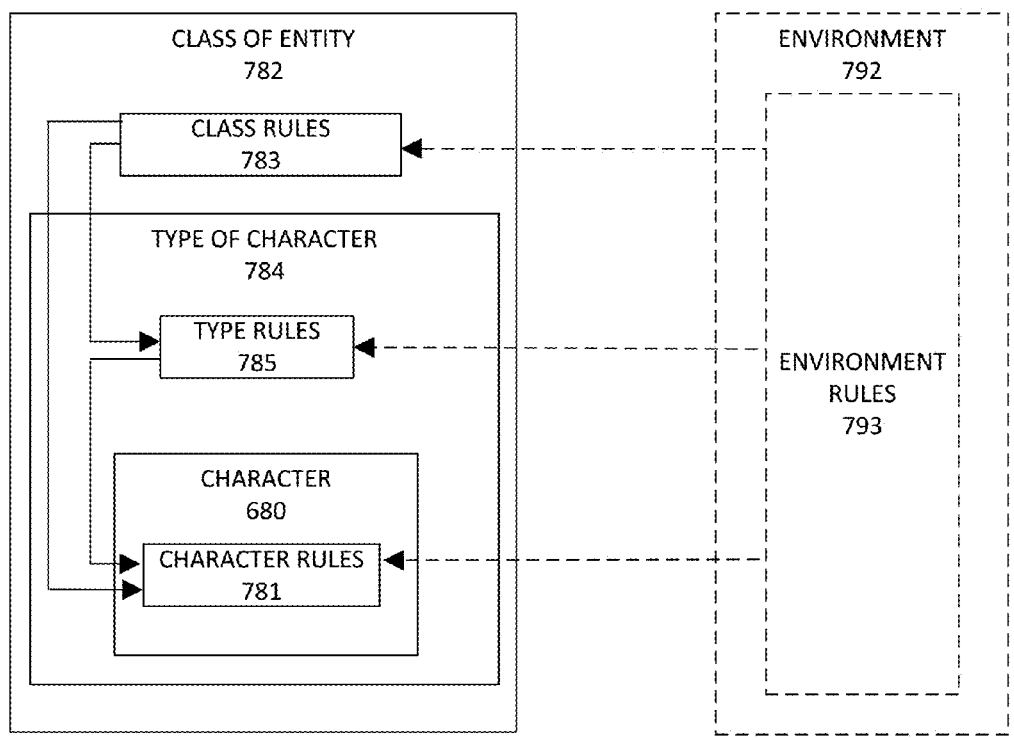
Figure 8:
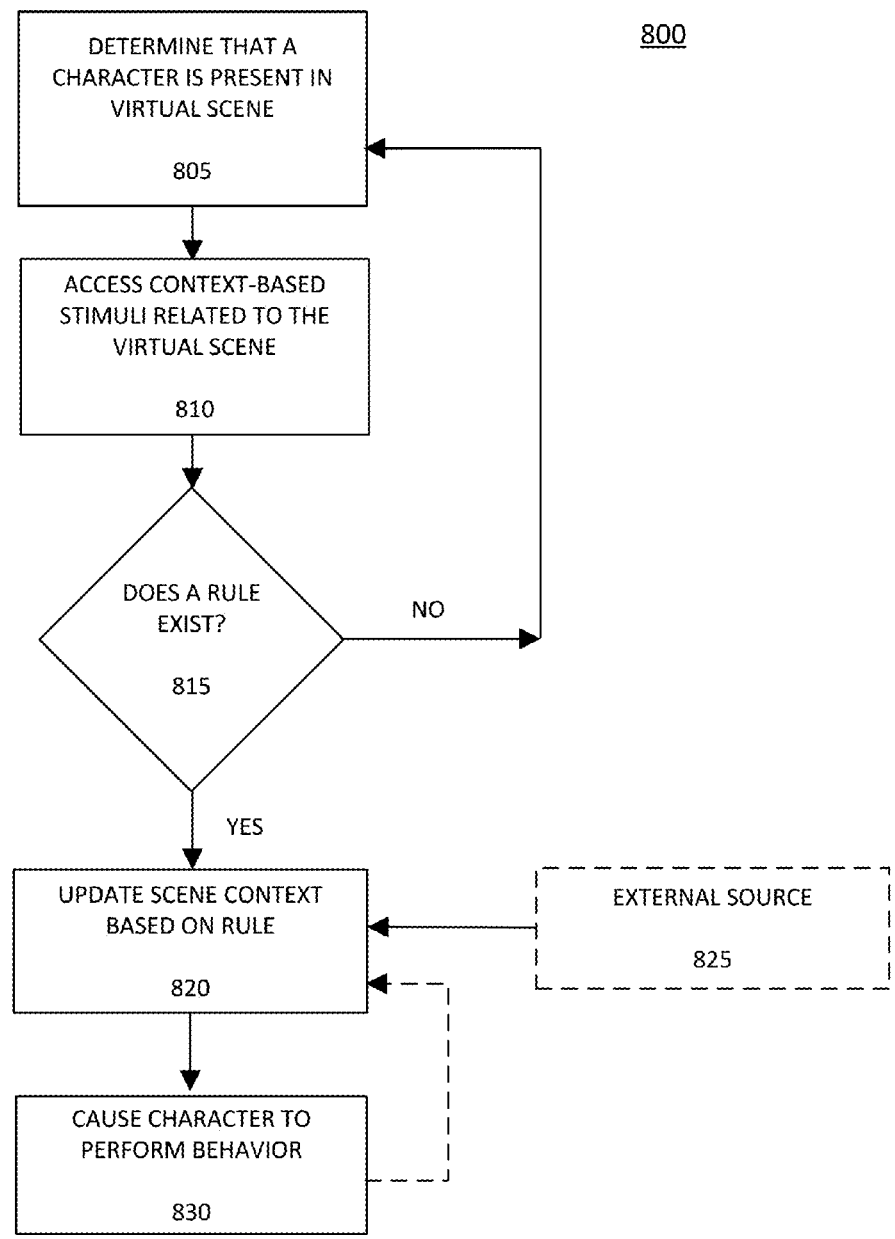
Figure 9A:
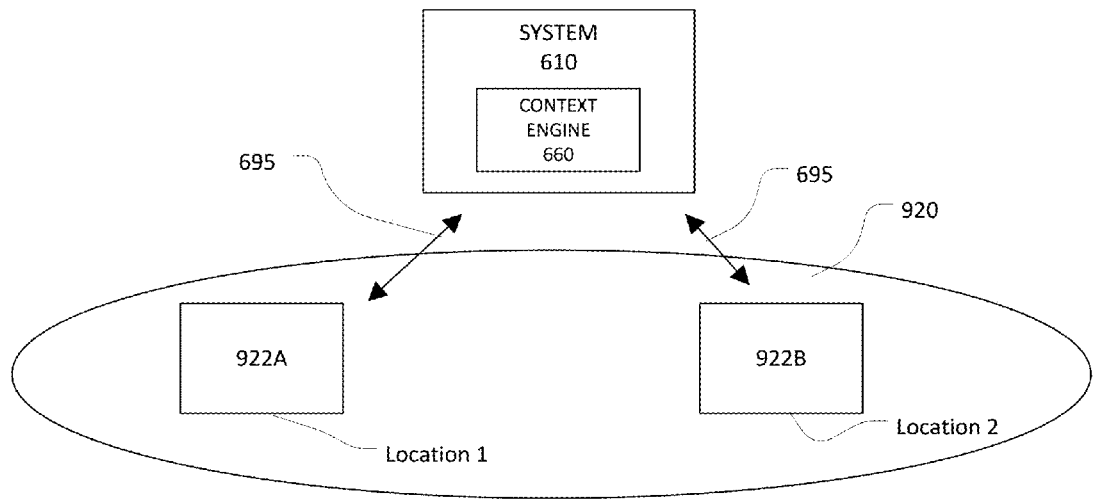
Figure 9B:
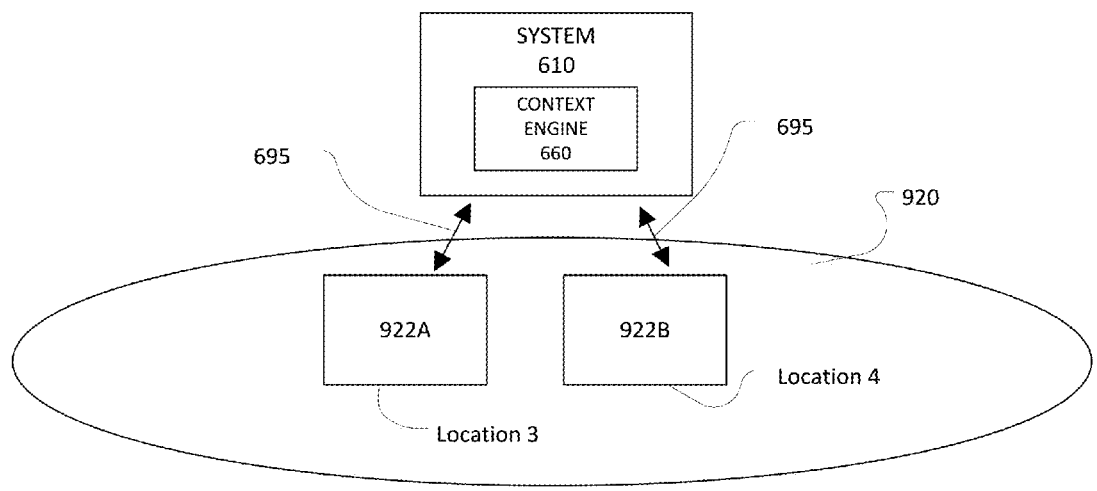
Figure 9C:
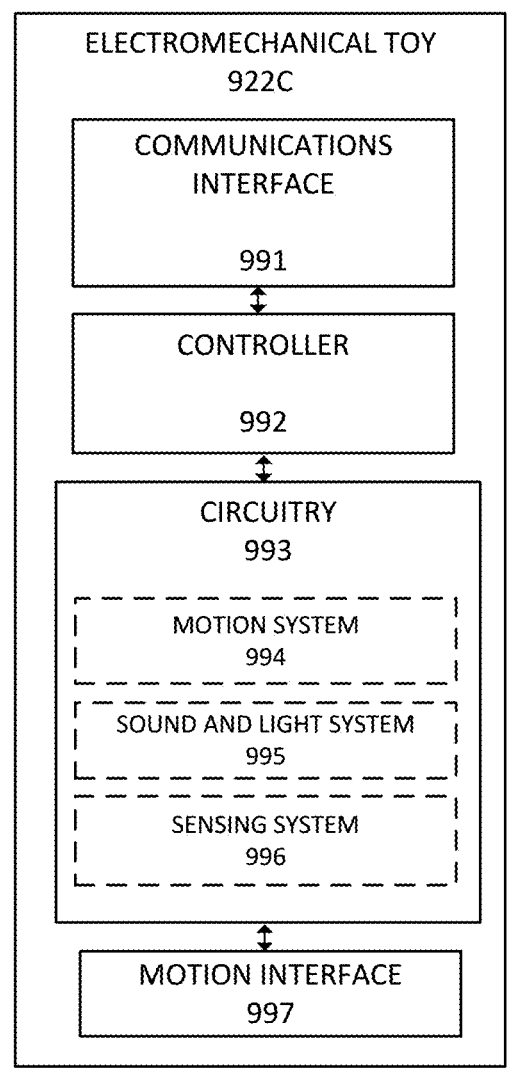
Figure 10A:
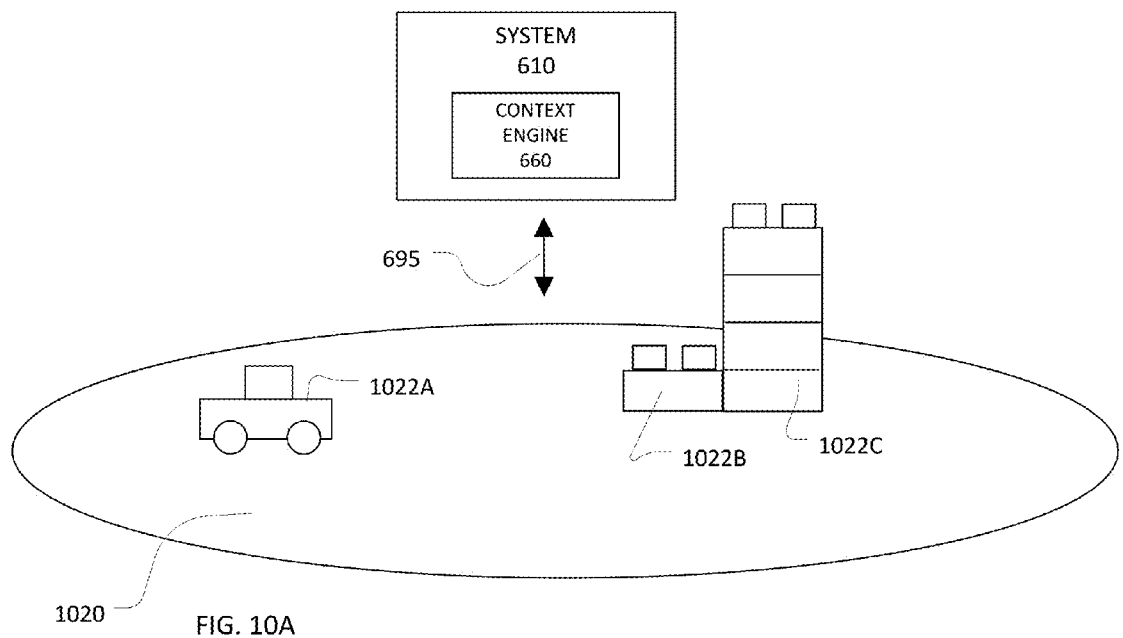
Figure 10B:
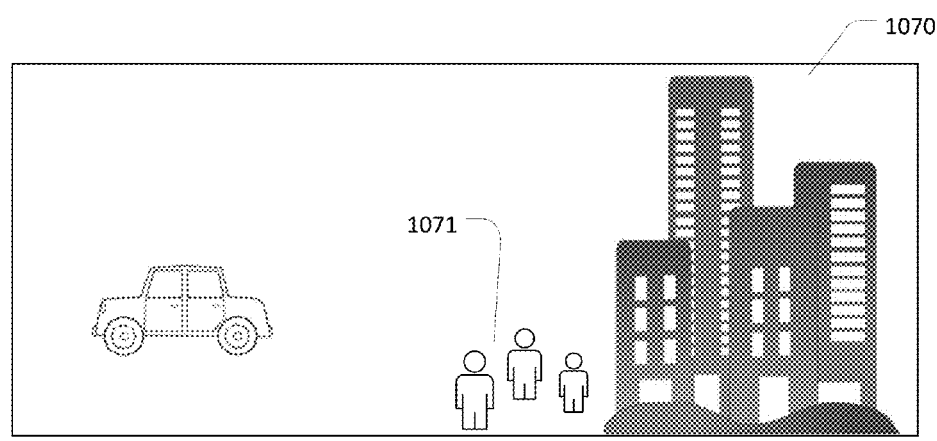
Figure 10C:
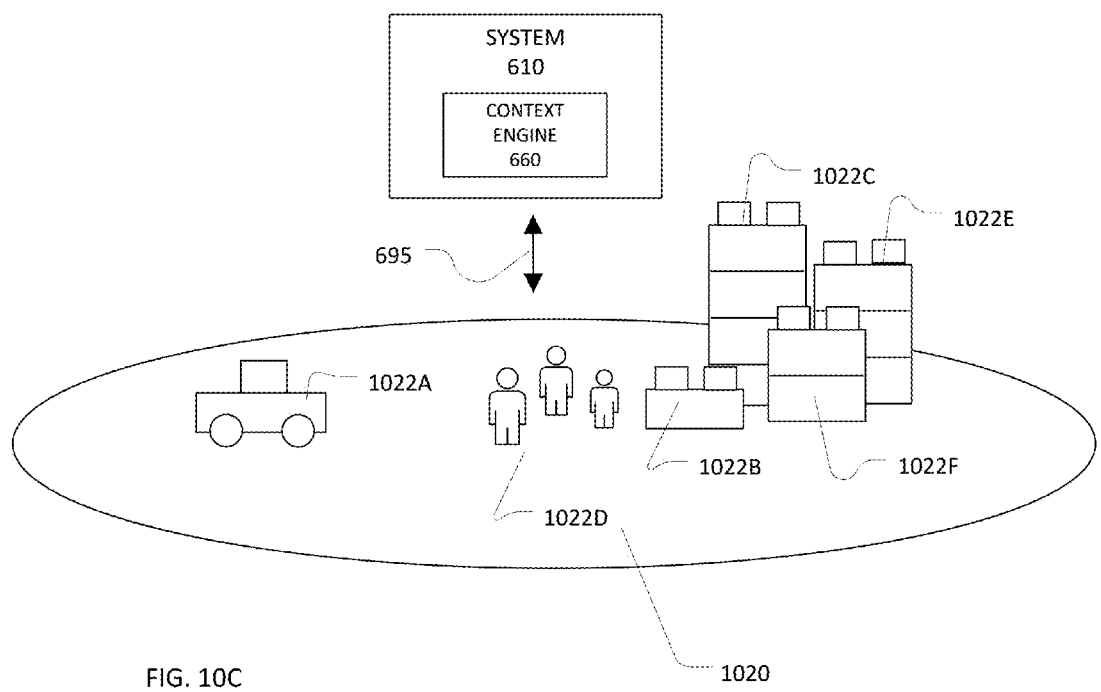
Figure 11:
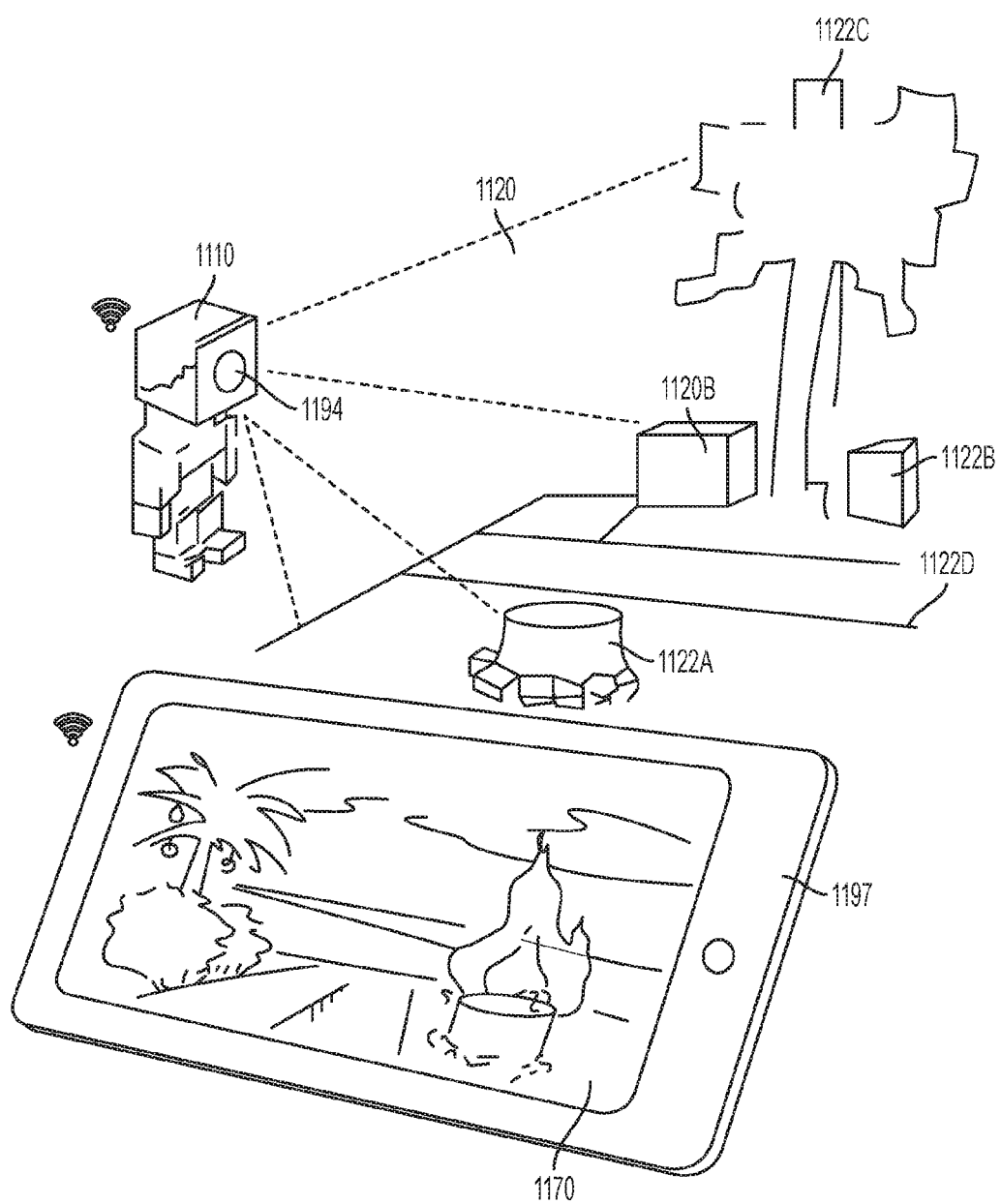
Figures 12A, 12B:
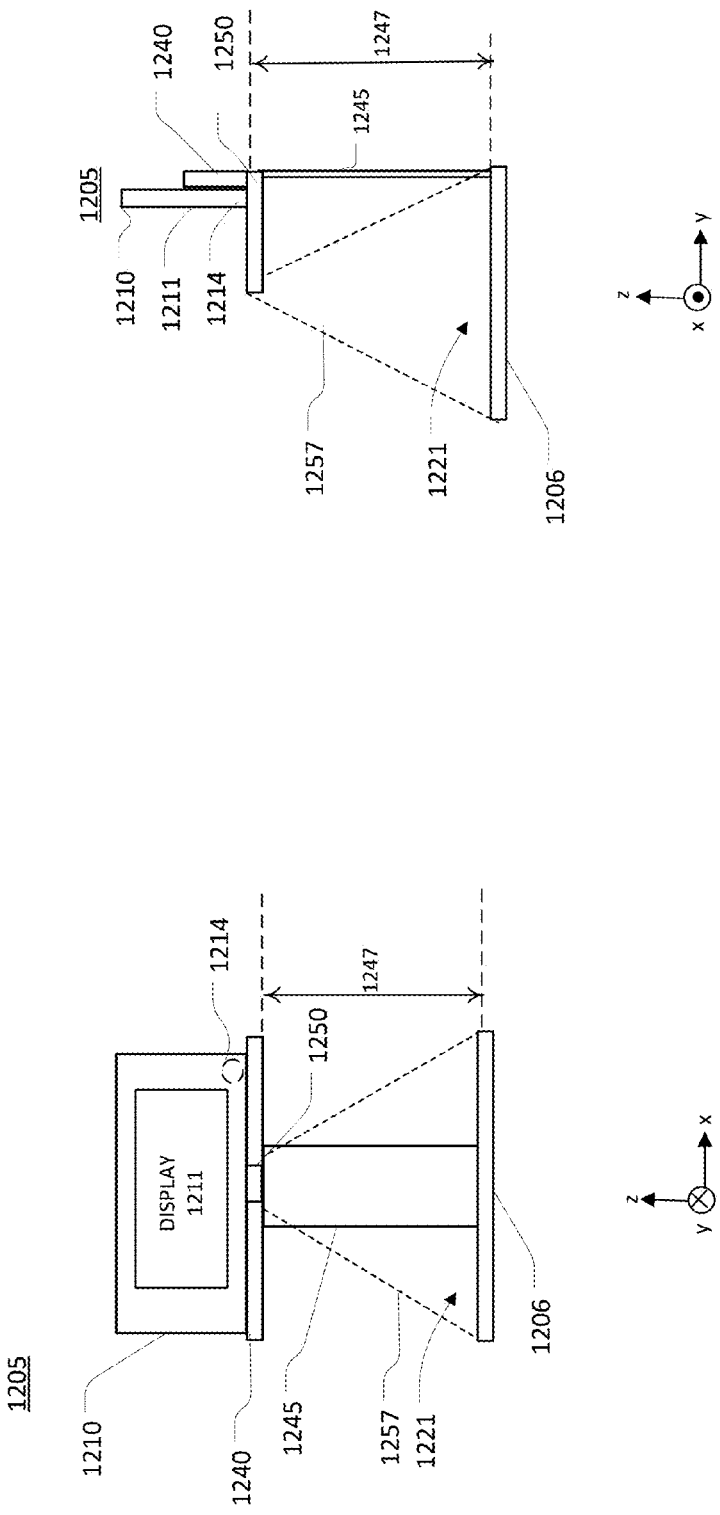
Figure 13:
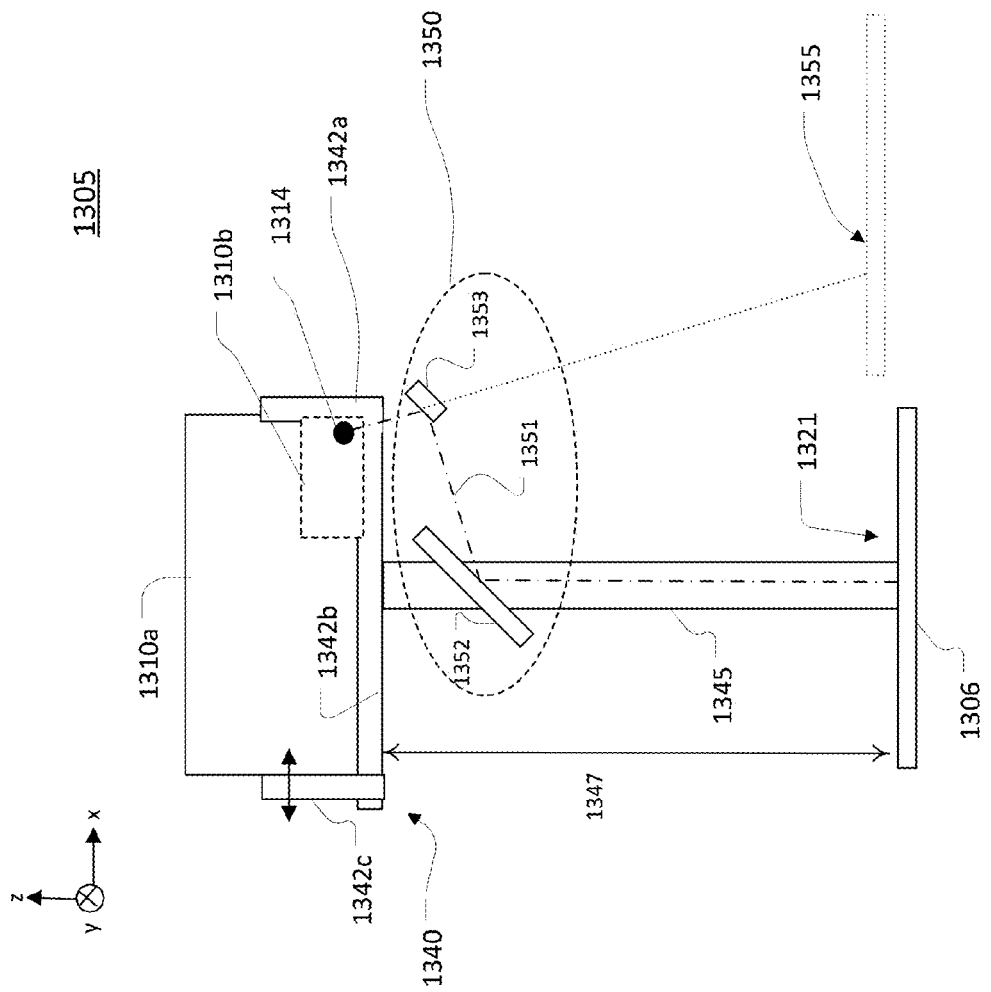
Figure 14B:
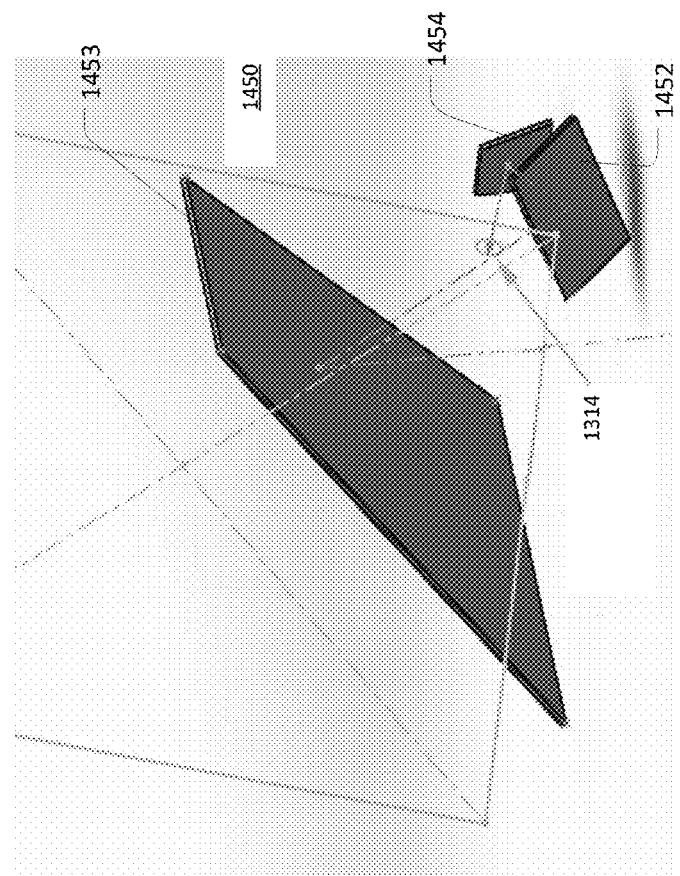
Figure 14A:
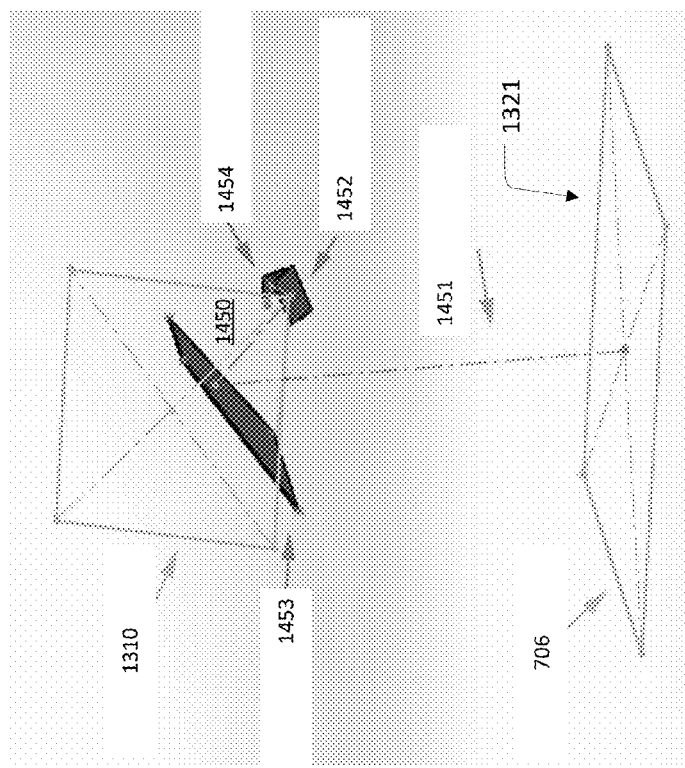
Figure 15:
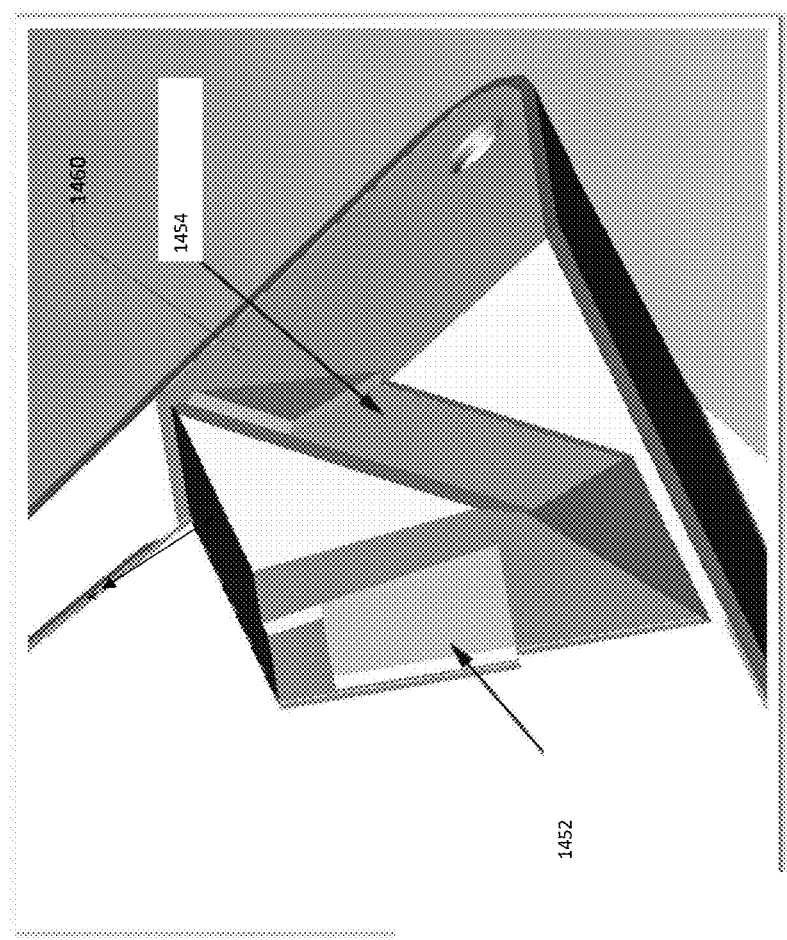

FIG. 1 is a block diagram of an exemplary toy system.
FIG. 2 is a sequence diagram of launching an exemplary application for a context-aware digital play system.
FIGS. 3A-3D show exemplary real-world scenes.
FIGS. 4A-4D show exemplary virtual scenes based on the real-world scenes of FIGS. 3A-3D.
FIG. 5 is a block diagram of an exemplary context-aware digital play system.
FIG. 6 is a block diagram of an exemplary toy system.
FIG. 7 is a block diagram of an exemplary rule inheritance pattern.
FIG. 8 is a flow chart of an exemplary process for context-aware play.
FIGS. 9A and 9B are block diagrams of an exemplary physical play space that includes electromechanical toys.
FIG. 9C is a block diagram of an exemplary electromechanical toy.
FIGS. 10A and 10C are block diagrams of a physical play space.
FIG. 10B is a block diagram of a visual display of a virtual scene.
FIG. 11 is a block diagram of a physical play space.
FIGS. 12A and 12B are block diagrams of an exemplary toy system.
FIG. 13 is a block diagram of another exemplary toy system.
FIGS. 14A, 14B, and 15 are perspective views of an exemplary optical assembly for a toy system.

DESCRIPTION

Techniques for augmented reality context-aware digital play are disclosed. Referring to FIG. 1, a block diagram of an exemplary toy system 100 that produces augmented reality content is shown. The toy system 100 includes a stand 105 that receives and holds a mobile device 110 in a fixed position that is a distance 104 from a real-world scene 120. The real-world scene 120 includes a real-world object 122 that overlays a real-world background 124. In other words, the object 122 is in the foreground of the real-world scene 120.

The mobile device 110 includes a display 111, an electronic processor 112, an electronic storage 113, an image sensor 114, and an input/output (I/O) interface 115. When the mobile device 110 is held in the stand 105, the real-world scene 120 is within the field of view of the image sensor 114 and the image sensor 114 may capture image data of the real-world scene 120.

The electronic processor 112 is one or more processors suitable for the execution of a computer program such as a general or special purpose microprocessor, and any one or more processors of any kind of digital computer. Generally, a processor receives instructions and data from a read-only memory or a random access memory or both. The electronic processor 112 may be any type of electronic processor.

The electronic storage 113 may be volatile memory, such as RAM, or non-volatile memory. In some implementations, the electronic storage 113 may include both non-volatile and volatile portions or components. The electronic storage 113 stores instructions, perhaps as a computer program, that, when executed, cause the processor 112 to communicate with other components in the mobile device 110.

The I/O interface 115 is any kind of electronic interface that allows the mobile device 110 to receive and/or provide data and signals to an operator and/or an automated process running on another electronic device. For example, the I/O interface 115 may include one or more of a touch screen or a communications interface that receives and/or provides data.

As discussed in more detail below, the toy system 100 is an augmented reality system that generates a virtual scene 130 based on the real-world (or physical) scene 120 assembled by the user of the system 100. The virtual scene 130 is completely digital and includes only fanciful representations of the real-world scene 120. Additionally, although the toy system 100 may use data from the image sensor 114 of the mobile device 110 to generate the virtual scene 130, the toy system 100 also may generate the virtual scene 130 and/or update the virtual scene 130 using a set of pre-defined rules and without using or receiving any data from the image sensor 114. In this manner, the toy system 100 may be more robust and easier to use than a system that requires constant or periodic data (for example, data that includes an image stream of the real-world scene) from a sensor to produce an augmented reality experience. In other words, the system 100 does not require a constant video feed or ongoing queries of the real-world scene 120 to produce the virtual scene 130.

FIG. 2 shows a sequence diagram 200 of exemplary application software (an "application") that may be executed on a mobile device 210. The sequence diagram 200 shows a context-aware play application 250 that resides in an operating system layer 201 of the mobile device 210. The context-aware play application 250 is one of several applications that reside in the operating system layer 201 of the mobile device 210.

The user launches the context-aware play application 250 by, for example, selecting an icon associated with the application 250. After the application 250 is launched, all of the business logic of the application 250 occurs within an application layer 202 of the mobile device 210. In other words, after the application 250 is launched, all of the actions that occur in the application 250 are carried out within the scope of the application 250 itself using processes or methods embedded within or otherwise part of the application 250. The application 250 does not launch other applications that are external to the application 250. The application 250 includes a context-aware digital play system 260, which is discussed below with respect to FIGS. 3A-3D, 4A-4D, and 5, and a distribution and consumption module 270. The distribution and consumption module 270 may aggregate content from the context-aware digital play system 260 into, for example, a movie, that may be output at the display 111 of the mobile device 110 or saved to the electronic storage 113.

An example of using the application 250 for a context-aware digital play experience is discussed with respect to FIGS. 3A-3D, 4A-4D, and 5. FIGS. 3A-3D show a real-world scene 320 at four different times, FIGS. 4A-4D show a virtual scene produced by the software application 250 at the four different times, and FIG. 5 shows a block diagram of the context-aware digital play system 260.

The example discussed with respect to FIGS. 3A-3D, 4A-4D, and 5 uses data from a sensor that monitors a real-world scene. However, in other examples, data from such a sensor is not used and the context-aware digital play experience operates in a "passive mode" that does not use sensor data.

Referring to FIGS. 3A-3D, an exemplary toy system 300 that includes a stand 305 for receiving and holding the mobile device 210 in a fixed position relative to a base 306 is shown. The mobile device 210 includes an image sensor 214. When held in the stand 305, the base 306 is within the field of view of the image sensor 214. Although the example of FIG. 3A-3D uses the stand 305, the context-aware application 250 may execute on the mobile device 210 without being held in the stand 305. For example, the context-aware application 250 may execute on the mobile device 210 while the user holds the mobile device 210.

Referring also to FIG. 5, the context-aware play application 250 invokes the context-aware digital play system 260, which includes a sensor data analysis module 261, a virtual scene analysis module 262, an interaction determination module 264, and a scene state database 266. The sensor data analysis module 261, the virtual scene analysis module 262, and the interaction determination module 264 include instructions that, when executed, cause an electronic processor 212 of the mobile device 210 to perform various actions. The instructions and the scene state database 266 are stored on an electronic storage 213 of the mobile device 210. The context-aware digital play system 260, the virtual scene analysis module 262, the interaction determination module 264, and the scene state database 266 are all accessed and/or executed within the application 250 without accessing external applications.

The scene state database 266 stores attributes, digital content (such as animation sequences and digital representations that provide visual and fanciful representations that are used to display a virtual object based on an identified physical object), and rules that are associated with the attributes. The attributes may be qualities, features, properties, and/or descriptors of the item with which the attributes are associated.

A virtual object is an electronic representation and is associated with attributes. The electronic representation may include any electronic content. For example, the electronic representation may include a digital representation that, when presented visually, provides a visually perceivable representation of the virtual object. The digital representation of the virtual object may be modified by, for example, an animation, the nature of which may be based on the attributes of the virtual object. In some implementations, the digital representation may include an audio component that produces a particular audible sound that is an audible representation of the virtual object. In some implementations, the electronic representation is an audio file that does not include a visual component.

The attributes of the virtual object may include, for example, the type of object, the location of the virtual object within a virtual scene relative to other virtual objects within a virtual scene or a location that is not relative to another virtual object, an action that the virtual object may perform, and/or an action that the virtual object performed in a previous instance of the virtual scene. The virtual object may be associated with a particular real-world object and/or with a type of real-world object. The attributes of the virtual object also may include attributes that are related to a real-world object with which the virtual object is associated. For example, the attributes of the virtual object may include a location of the associated real-world object relative to a real-world background, the type of real-world object with which the virtual object is associated, an identifier of a particular real-world object with which the virtual object is associated, and/or behaviors (such as motions or sounds) that the real-world object typically performs.

The attributes of the virtual object may be static (unchanging and persistent) during the execution of the application 250. In some implementations, some or all of the attributes associated with a particular virtual object, or an aspect of some or all of the attributes, may change while the application 250 is running. For example, some attributes have static aspects that do not change while the application 250 is running and procedural aspects that may be changed while the application 250 is running. A cat virtual object is associated with a "walk" attribute, which may indicate that an animation showing the cat walking may be applied to the virtual cat object. The "walk" attribute is a prescribed attribute in that walking is a behavior or action associated with real-world cats. Thus, the "walk" attribute may be associated with all of the virtual cat objects that are stored in the scene state database 266.

In addition to being a prescribed attribute, the attributes of the virtual objects may include a procedural aspect that may be modified or augmented while the application 250 is running. For example, the "walk" attribute may have a procedural aspect that describes the mechanics (for example, direction of motion or a swagger) of the walking. The procedural aspect of the "walk" attribute may be represented (for example, stored) in the scene state database 266 by a functional constraint with, for example, a location (X) being a functional variable. The functional variable determines how the virtual cat object walks, and the value of the functional variable may vary while the application 250 is running and while the prescribed attribute remains "walk." The functional variable may come from, for example, sensor data, a direct user input, from the scene state database 266, or a random variable generated within the application 250. By allowing the value of the functional variable to vary, the virtual cat object may, for example, be animated to appear to walk in different directions and walk in different ways while the application 250 executes. Additionally, by having attributes that include prescribed and procedural aspects, virtual objects of the same type may have different animations applied. For example, two cat virtual objects both have a "walk" prescribed attribute but may be visually presented and animated to walk in different directions at the same time.

The attributes of the virtual object may also include information that governs how the virtual object interacts with other virtual objects. Continuing the example above, the cat virtual object also may have an attribute "climb" that is linked to types of virtual objects that the virtual cat may climb, such as trees, chairs, and drapes. This linkage allows the possibility of the virtual cat object being modified by, for example, animation, to climb a virtual tree, chair, or drape object with which the virtual cat object interacts. Interactions between virtual objects are discussed in greater detail with respect to FIGS. 4B and 4C.

In some implementations, when a virtual object performs an action by having a rule applied to the digital representation of the virtual object, the attributes of the virtual object are updated in the scene state database 266 to indicate that the action has been performed. This update to the attribute may be used, for example, to prevent the same action from being performed again during the execution of the application 250. Additionally, the updating of the attribute may be used to initiate a new ongoing animation of another virtual object that is linked to the action. For example, after a rule that causes an animation of the virtual cat object to climb the tree is applied, birds that were in the tree are animated to fly in the vicinity and do not return to the tree.

Additionally, the attributes of a virtual object may include a physics-based model that describes how to modify the digital content of a virtual object in response to the occurrence of a physical event. For example, the physics-based model may describe how light reflects from a virtual object that has an attribute of "reflective" or "shiny."

A virtual scene includes one or more virtual objects and is an electronic representation of a real-world (physical) play scene. The real-world play scene may be a play scene that is imaged or otherwise sensed by the mobile device 210, and the virtual scene may be based on the data collected by the mobile device 210. In some implementations, the virtual scene may be a representation of a possible real-world play scene that is not sensed by the mobile device 210. For example, the virtual scene may be an electronic representation that was loaded onto the mobile device 210 and stored in memory at a prior time. In another example, the virtual scene may be electronic content that is downloaded to the mobile device 210 from a remote server or a website.

The virtual scene is made up of digital content and attributes associated with the digital content. An instance of the virtual scene is the digital content and attributes that describe the virtual scene at a particular time. The attributes associated with the virtual scene may include, for example, the location of the scene (for example, a type of location, such as beach or a specific location, such as a particular city), the types of objects in the virtual scene, the types of objects that were in a previous (earlier occurring in time) instance of the virtual scene, and/or the distance between the various objects in the virtual scene. The attributes of the virtual scene and/or virtual objects in the virtual scene may be obtained from the virtual scene and/or from data produced by a sensor that monitors the real-world scene. The real-world scene may be a physical scene constructed by the user, and, in these examples, the virtual scene may be a fanciful digital representation of the real-world scene that is informed by data from a sensor that monitors the real-world scene. In other implementations, the virtual scene is a digital representation that is independent of data from the sensor, and is not based on a physical play scene constructed by the user.

The attributes of the virtual object and the virtual scene are stored in the database 266. The database 266 also stores rules that describe actions that are applied to the virtual objects and/or virtual scenes. The rules are instructions, perhaps in the form of a computer program, that, when applied to digital content, modify the digital content in accordance with the rule. The rule may be, for example, an animation sequence that is stored in association with an identifier of a particular physical toy and with a particular known behavior of an animal depicted by the physical toy. An example of a rule associated with a cat-like toy is that cats generally do not like to swim in water. Thus, an identifier of a cat-like toy may be associated with an animation that shows a cat drinking water and tapping the water with one of its paws. However, the identifier of the cat-like toy is not associated with an animation of a cat swimming in water. The database 266 stores such a rule in association with an identifier of the cat-like toy and/or a virtual object of a cat so that the rule may be applied to the virtual object of the cat.

The scene state database 266 also stores executable logic, perhaps in the form of a computer program, for all or some of the virtual objects. The executable logic may be a rule, and the executable logic may add procedural qualities (such as the procedural aspects discussed above) to one or more of the attributes of a virtual object. Continuing an example discussed above, the virtual cat object has an attribute "walk" that indicates that walking is an action that the virtual cat may perform (that is an animation that may be applied to the virtual cat object). The procedural aspect of the "walk" attribute is represented by the functional variable. The procedural aspect of the walk attribute may be modified or augmented by applying the executable logic to the digital content associated with the virtual cat object in view of the value of the functional variable.

An example that illustrates the operation of the modules 261, 262, 264, and the scene state database 266 is discussed below with reference to FIGS. 3A-3D and 4A-4D. The modules 261, 262, 264, and the scene state database 266 operate within the application 250 and without accessing separate applications.

Figure 3A:
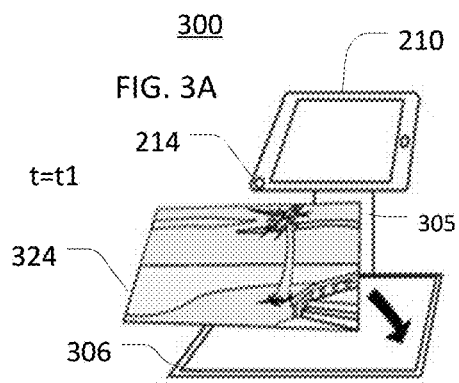

Referring to FIG. 3A, at a time t1 that occurs after the application 250 has been launched, the user builds a real-world (physical) scene 320 by placing an object 324 (in this example, the object is a real-world background) onto the base 306. When the real-world background 324 is placed in the base 306, the image sensor 214 may produce an image of the background 324.

Alternatively, or additionally, the base 306 and/or the object 324 may include a capacitive touch sensor or a magnetic sensor that senses the presence of the background 324 and provides a signal to the mobile device 210 indicating that the user has placed an object on the base 306. The image sensor 214, the capacitive touch sensor, and the magnetic sensor are all sensors that monitor the real-world scene 320.

The sensor data analysis module 261 receives the data from a sensor that monitors the real-world scene 320 (the image sensor 214, the capacitive touch sensor, and/or the magnetic sensor in this example). The sensor data analysis module 261 analyzes the data from the sensor, when sensor data is available. For example, the real-world background 324 may include an identifier such as a Zapper code, a bar code, or a particular color that allows the background 324 to be identified as being a particular background or object from the sensor data by the sensor data analysis module 261.

As noted above, the scene state database 266 stores attributes in association with the identifier of the real-world background 324. These attributes are attributes associated with an instance of a virtual scene 430 (FIG. 4A) that is based on the real-world background 324. The attributes may include a place attribute with the value "beach" and an attribute that indicates that the real-world scene identified by the sensor data analysis module 261 includes objects "water," "palm tree," "boardwalk," and "sand." The attributes may also include relative locations of the objects on the real-world background 324 and allowed behaviors that may occur within the virtual scene 430 based on the background 324.

The allowed behaviors associated with the virtual scene 430 that is based on the background 324 may include, for example, "swim," "walk," "idle," and "jump." The allowed behaviors may be stored in the database 266 in association with an identifier of the background 324. The attributes may also include a pointer or other indication of a location of digital representation to be used to generate the virtual scene 430. In this example, the digital representation is a fanciful beach illustration that is not a photograph of the real-world background 324. In some implementations, the digital representation that is used to generate the virtual scene 430 is stored in the database 266 in association with the identifier of the background 324 and the attributes include the digital representation.

The attributes of the virtual scene 430 that is associated with the real-world background 324 may be pre-set at the time that the application 250 is created. Alternatively or additionally, the application 250 may be configured to allow the user to enter some or all of the attributes of the virtual scene 430 that is associated with the real-world background 324 into the scene state database 266.

In addition to the attributes of the background 324, the scene state database 266 also stores a value that represents the previous state of the virtual scene 430 and/or the previous state of an attribute of the virtual scene 430. At the time t1 (FIG. 3A), the previous state of the place attribute of the virtual scene 430 is "none" because there was no real-world scene present when the user launched the application 250. In some examples, such as when the user ended the application 250 and left the real-world background 324 on the base 306, the previous state of the place attribute may be "beach." Thus, the application 250 may hold a state of a particular attribute after the user exits the application 250. This allows the user to continue to play in a particular real-world scene over a relatively long period of time, for example, days or weeks.

Figure 4A:
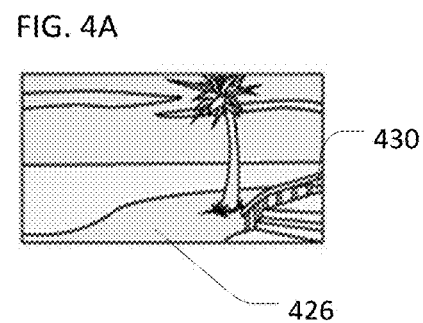

Referring further to FIG. 4A, the system 260 generates the virtual scene 430 based on the attributes and displays the virtual scene 430 on a display of the mobile device 210. In this example, the previous location is "none," causing the fanciful beach image to be visually presented at the mobile device 210 without first showing a transition image (such as an airplane or car) to explain a change in scene to the user. The scene state database 266 is updated based on the virtual scene 430. For example, the previous location attribute may be updated from "none" to "beach."

Figure 3B:
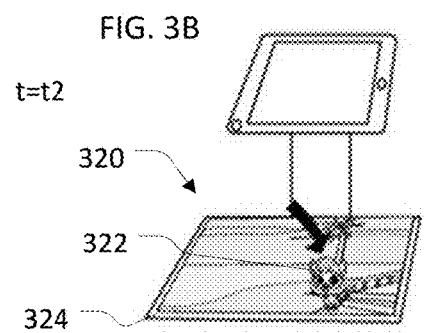

Referring to FIG. 3B, at a time t2 that occurs after the application 250 has been launched and after the time t1 (FIG. 3A), the user continues to play in the real-world (physical) scene 320 by placing a real-world (physical) object 322 on the real-world background 324. In this example, the object 322 is a toy cat, and the user places the toy cat 322 on the right side of the background 324 near the bottom of the boardwalk.

The toy cat 322 is detected by the sensor that monitors the real-world scene 320 (the image sensor 214, a capacitive sensor, and/or a magnetic sensor), and the data from the sensor is analyzed by the sensor data analysis module 261 to determine the position of the toy cat 322 relative to the various items shown in the real-world background 324 (such as the water and the sand that are part of the real-world background 324). Additionally, the sensor data analysis module 261 identifies the object 322 as a toy cat and that the real-world background 324 is unchanged from the beach scene. The object 322 may be identified as a particular toy cat through, for example, image recognition, a code on the object 322, or by any other known technique.

The sensor data analysis module 261 provides the data to the virtual scene analysis module 262, which determines attributes of a virtual scene that is based on the real-world scene 320. The attributes may be determined by querying the scene state database 266 with an identifier of the background 324 and retrieving attributes that are stored in the scene state database 266 in association with the identifier. In some examples, the attributes may also be determined directly from the sensor data. In the example of FIG. 3B, the location attribute of the corresponding virtual scene is "beach" and the attributes describing the virtual objects of the virtual scene include "cat," "water," "palm tree," "boardwalk," and "sand." The "cat" object was not present in the prior instance of the virtual scene (the virtual scene 430 of FIG. 4A), thus, the "cat" object has an attribute of "new" to indicate that the "cat" is new to the virtual scene. The attributes also include a distance between the "cat" and the other virtual objects. These attributes are used to generate a virtual scene 430B (FIG. 4B).

Figure 4B:
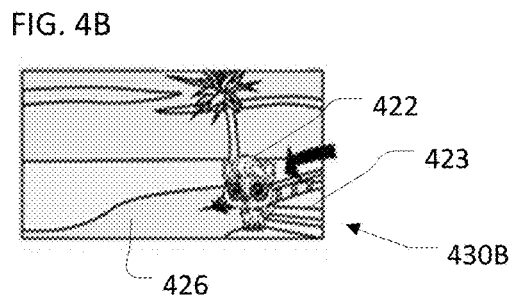
Figure 4C:
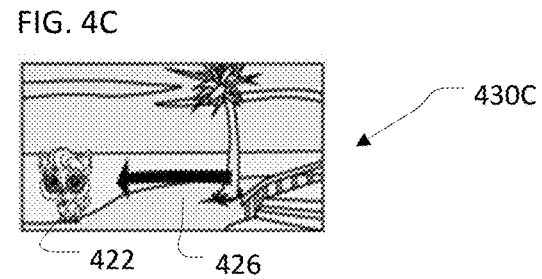
Figure 4D:
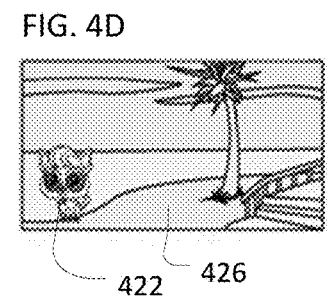

FIG. 4B shows the virtual scene 430B, which includes a virtual cat object 422 and a virtual boardwalk 423. The virtual scene 430B is an instance of the virtual scene 430 (FIG. 4A). That is, the virtual scene 430B of FIG. 4B shows the virtual scene 430 shortly after the time t2. Thus, the virtual scene 430B is updated as compared to the virtual scene 430 and includes, for example, the virtual cat object 422 as a result of the application 250 identifying the cat object 322.

From within the previously launched application 250, the interaction determination module 264 determines that the virtual cat object 422 is close enough to the virtual boardwalk object 423 that the virtual cat 422 and boardwalk 423 "interact." An interaction between virtual objects triggers a relational behavior that modifies a digital representation of one or both of the virtual objects based on a rule or rules that are associated with the virtual objects. Two virtual objects overlap if the spatial representation of the objects coincide or overlap. In some implementations, virtual objects include a collision boundary that extends beyond the visual representation of the virtual object and is concentric with the virtual object. The collision boundary defines a collision region that completely includes the virtual object and extends spatially beyond the virtual object. In these implementations, two or more virtual objects overlap if any part of the collision regions of the virtual objects overlap or coincide.

A behavior for the virtual cat 422 is selected from the scene state database 266 based on the virtual cat 422 and virtual boardwalk 423 interacting and also on the attribute "new" that indicates that the virtual cat 422 is new to the scene. In this example, the behavior is represented by a rule that specifies an animation that causes the virtual cat 422 to appear in the virtual scene 430 by entering the scene from the right edge of the virtual scene 430B and descending the stairs until the virtual cat 422 is positioned within the virtual scene 430B at a location that is similar to the relative location of the real-world cat 322 in the real-world scene 320. Thus, the virtual cat 422 entered the virtual scene 430B in a realistic manner even though the user did not make the real-world cat 322 traverse the boardwalk on the real-world background 324. In this manner, a high-quality animation is produced in the virtual scene 430B without having to rely on data from, for example, the image sensor 214 to track actual movements of the real-world object 322 in real-time or concurrently with the actual movements of the real-world object 322.

Figure 3C:
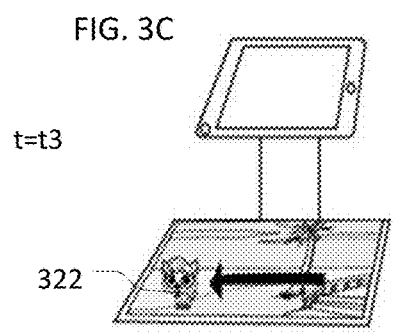

Referring to FIG. 3C, at a time t3 that occurs after the application 250 has been launched and after the time t2 (FIG. 3B), the user continues to play in the real-world (physical) scene 320 by moving the object 322 to the far left side of the real-world background 324. The location attribute for the virtual scene remains "beach" and the object attributes include "cat," "water," "palm tree," "boardwalk," and "sand."

The sensor data analysis module 261 determines the new location of the object 322 from data collected by the sensor that monitors the real-world scene 320. The attributes used to generate the virtual scene also include a distance between the previous position of the real-world object 322 and the current position of the real-world object 322. The virtual scene analysis module 262 determines a new location for the virtual cat 422 based on the motion of the real-world object 322. The module 262 determines that the new location of virtual cat object 422 will be close enough to interact with the virtual water or the virtual sand 426 and that the virtual cat 422 could have moved to the new location through the water (by swimming or wading) or by walking on the sand. A behavior to move the virtual cat 422 from the bottom of the virtual boardwalk to a location nearer the left side of the virtual scene (to mimic what the user has created in the real-world scene) is selected from the scene state database 266.

The possible behaviors are limited by the characteristics of the objects to which the behaviors are to be applied. In this example, the virtual object that corresponds to the real world object 322 is the virtual cat 422, and the available behaviors are based on the expected behavior of a cat. Thus, because cats generally do not like water, the scene state database 266 returns a behavior that, when applied to the virtual scene 430 modifies the virtual cat 422 by an animation that shows the virtual cat walking through the sand from the bottom of the virtual boardwalk 423 (the location of the virtual cat 422 in the virtual scene 430B of FIG. 4B) to the left side of the virtual scene. Additionally, the virtual sand object 426 is modified (based on a physics-based model that is an attribute of the virtual sand object 426 and is stored in association with the virtual sand object 426 in the scene state database 266) to show cat prints in the sand to add to the effect that the virtual cat 422 walked on the sand. A modified virtual scene 430C is generated based on the applied rules and visually displayed. The virtual scene 430C shows the virtual cat 422 on the left side of the scene and cat prints in the virtual sand 426. Additionally, the scene state database 266 may be updated to reflect that the virtual cat 422 walked across the virtual sand 426.

Thus, from within the already launched application 250, the virtual cat 422 is animated based on the information from the database 266 and the visual appearance of the virtual sand 426, which is another virtual object of the virtual scene, is modified. The animation of the virtual cat 422 and the modification of the virtual sand 426 is informed by the data from the sensor. In this example, the virtual cat 422 traversed the virtual sand 426 because the user moved the real-world cat 322 to the left in the real-world scene 620. However, the animation of the virtual cat 422 and the modification of the virtual sand 426 is not dependent on receiving constant or high-quality data from the sensor. As such, the animation of the virtual cat 422 and the modification of the virtual sand 426 occurs regardless of whether the sensor is able to track the exact movement of the real-world cat 322 relative to the real-world background 324 in real time or concurrently with the movement of the real-world cat 322.

Figure 3D:
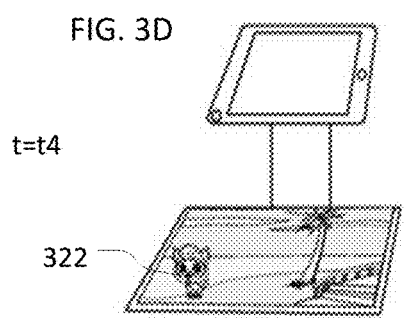

Referring to FIG. 3D, at a time t4 that occurs after the application 250 has been launched and after the time t3 (FIG. 3C), the user has stopped playing in the real-world scene 320 and the object 322 has not moved since the time t3. No sensor data is received, and the sensor data analysis module 261 does not make a determination regarding the position of the real-world object 322 based on sensor data. A behavior is selected for the virtual cat 422 based upon the characteristics of the virtual cat 422 without considering sensor data. Thus, the behavior may be selected without receiving any sensor data and in the absence of sensor data. The scene state database 266 is queried to retrieve a behavior from among a finite number of behaviors associated with the real-world object 322 (which is a toy cat in this example).

The range of possible behaviors may be further reduced by querying the scene state database 266 to determine the most recent action of the virtual cat 422 and the location of the virtual cat 422. In this example, the most recent action of the virtual cat 422 was walking across the virtual sand 426, and the cat has not moved from its previous location near the virtual water. The range of available behaviors based on the attributes of the cat and the location of the cat 422 (interacting with the water and the virtual sand 426) may be "idle," "hunt for fish near the shore," "curl up and sleep," and "prance and dance." Because the virtual cat 422 most recently trekked across the virtual sand 426, it is most likely that the virtual cat 422 will rest or eat. The scene state database 266 selects one of "hunt for fish near the shore" and "curl up and sleep" at random and modifies the virtual objects based on the selected rules to generate an updated virtual scene.

Additionally, the context-aware digital play application 250 allows users to make videos and other content. Because the application 250 is not completely reliant on sensor data and may operate in the absence of sensor data, the videos and content produced by the application 250 are high quality regardless of whether high quality sensor data is available.

The context-aware system allows the user to view and interact with a completely digital and fanciful version of the object and the background. Because of this feature, the context-aware digital play system 250 does not rely on continuously receiving image data from the image sensor 214 of the mobile device 210. Instead, the rules stored in the scene state database 266 cause the virtual object to perform actions that are consistent with the user's expectation of how the object should behave. This reduces the system's reliance on sensors and other electronic equipment and may produce a more robust play environment. Additionally, the scene in which the object is placed may also be displayed as a virtual scene instead of a photograph or video obtained from data from the mobile device. The virtual scene may also be modified based on the animated object's actions and/or by rules associated with the virtual scene.

In some implementations that use data from a sensor, the data from the sensor is analyzed and compared to a data metric and only used if the metric exceeds the threshold. The data metric may be a numerical metric that represents the quality of the data from the sensor. Comparing the data to the data metric prevents or reduces poor-quality data and/or data that includes inappropriate content from being included in a virtual scene generated by the application 250. Additionally, the data metric may include metadata of a snapshot (or instance) of the virtual scene generated by the application 250. The metadata may be, for example, a measure of the user's positive or negative reaction to the snapshot and may be used to create similar virtual scenes (in the case of a positive reaction) or to not create similar virtual scenes (in the case of a negative reaction).

Further, the user may place props near the real-world object to cause the animated virtual representation of the object to act in a manner consistent with the prop. For example, placing a microphone prop near the toy cat 322 may cause the virtual cat 422 to pick up a virtual microphone and to begin to sign and dance.

Thus, the system 200 provides for context-aware digital play. Making videos and playing digitally on a mobile device (such as the mobile device 210) based on or using physical toys may be challenging, particularly for a child. Additionally, challenges with data quality from sensors (such as video cameras or the image sensor 114 of the mobile device 110) that may be used to image the physical toys may cause portions of the videos to be poor quality. The techniques disclosed above may make generation of videos and other forms of digital play (such as virtual games) more approachable and satisfying by using a context of the real-world scene (characteristics or attributes of the scene) to automatically fill in the blanks (caused by, for example, interruptions in the data from the sensor) while the player plays with their toys normally.

For example, the scene state database 266 may be considered to be a persistent data store or a database of data, and the data may be leveraged to create a contiguous context in the absence of data from a sensor using feed-forward analysis. Instead of software that performs an action once it "sees" an object, the context-aware digital play technique implemented by the system 200 uses the data stored in the scene state database 226, which may include a rule-based model of what a user (player) expects to see and also may use whatever data is available, if it is available, to verify this rule-based model. In this manner, the technique leverages pre-defined rules rather than relying exclusively on data from device sensors, which may be unreliable and poor quality.

In some implementations, the rule-based model included in the scene state database 266 may mimic the neurobiological way the brain creates mental models using minimal intermittent bits of data from sensory input mechanisms. In these implementations, scene state database 266 or the electronic storage 213 includes digital logic or instructions that, when executed by the electronic processor 212, implement a feed-forward software representation of a visual cortex. In other words, the data in the scene state database 266 may include rules that mimic or approximate a preexisting "understanding" of a physical scene (for example, the play space 120) to limit the range of interactions that may occur in a corresponding virtual scene. The scene state database 266 may enable interactions between a physical object (such as the object 122) and the system (such as the system 100 or 200) that require little to no data from a sensor that monitors the physical toy yet enable creation a series of rich interactions, leveraging an understanding of a virtual model or virtual representation of the physical scene rather than performing one-to-one interactions between the physical toys and virtual objects.

FIG. 6 is a block diagram of an exemplary toy system 610. The toy system 610 includes a context engine 660 that drives virtual and/or physical actions based on the presence of a character 680. The context engine 660 receives or accesses digital content 672 or other information that describes or represents a virtual scene 670. The virtual scene 670 may be an electronic representation of a real-world (physical) play scene. The real-world play scene may be a play scene that is imaged or otherwise sensed by the toy system 610, and, in these implementations, the virtual scene 670 may be based on the data collected by the toy system 610. In some implementations, the virtual scene 670 may be a representation of a possible real-world play scene that is not based on data sensed by the toy system 610. For example, the virtual scene 670 may be an electronic representation that was loaded onto the toy system 610 and stored in memory at a prior time. In another example, the virtual scene 670 may be electronic data that is downloaded to the toy system 610 from a remote server or a website.

If an indication or representation 674 of the character 680 is present in the digital content 672, the context engine 660 may apply one or more rules 676 to the virtual scene 670 by modifying the representation 674 and/or the digital content 672 in accordance with the rules 676. The context engine 660 may be used for game play, creation of movies and/or games, and/or control of physical toys. As discussed below, the rules 676 are context-based, and application of the rules 676 results in the representation 674 and/or the digital content 672 being modified in a manner that is likely to be consistent with the user's expectations regardless of whether the user provides input to the toy system 610. Thus, the context engine 660 reduces or eliminates the reliance of the toy system 610 on sensors and other input mechanisms. In this way, the context engine 660 may enhance the user's experience by providing a more reliable and consistent play environment. Additionally, the toy system 610 allows users to have a completely digital experience or one that involves physical toys, or an experience that includes both digital and physical aspects, thereby providing the user with more play options and increasing the opportunities for fun and enjoyment.

In addition to the context engine 660, the toy system 610 also includes an input/output (I/O) interface 615 and an electronic storage 613. The I/O interface 615 provides data to and receives data from the context engine 660, and the electronic processor 612 executes instructions stored on an electronic storage 613, perhaps as a computer program, to implement the actions of the context engine 660. FIGS. 8-11 provide examples of the actions of the context engine 660. The context engine 660 includes the electronic storage 613, which, in addition to the instructions, stores information related to the virtual scene 670, the digital content 672, and the rules 676.

The electronic processor 612 may be may be one or more processors suitable for the execution of a computer program such as a general or special purpose microprocessor, and any one or more processors of any kind of digital computer. Generally, a processor receives instructions and data from a read-only memory or a random access memory or both. The electronic processor 612 may be any type of electronic processor, may be more than one electronic processor, and may include a general purpose central processing unit (CPU), a graphics processing unit (GPU), a microcontroller, a field-programmable gate array (FPGA), and/or an application-specific integrated circuit (ASIC). The electronic storage 613 may be volatile memory, such as RAM. In some implementations, the electronic storage 613 may include both non-volatile and volatile portions or components. Examples of electronic storage may include solid state storage, magnetic storage, and optical storage. Solid state storage may be implemented in, for example, resistor-transistor logic (RTL), complementary metal-oxide semiconductor (CMOS), or carbon nanotubes, and may be embodied in non-volatile or volatile random-access memory.

The virtual scene 670 includes the digital content 672, which may include an electronic representation 674 of the character 680. The character 680 is an entity that is distinguished from other entities by traits such as, for example, personality, nature, disposition, appearance, temperament, and/or abilities. The character 680 may have characteristics of a living entity (for example, the character may be human-like, plant-like, or animal-like), or the character may have characteristics of an inanimate or non-biological entity (for example, a building, automobile, animatronic toy, or robot).

The virtual scene 670, which includes the digital content 672, is an electronic representation of a scene in which the character 680 acts or operates. The virtual scene 670 may be an electronic representation of a physical scene that is imaged by the I/O interface 615. In these examples, the digital content 672 may be, for example, an image of the physical scene, or an electronic representation that is purely fanciful but derived from such an image.

In some implementations, the virtual scene 670 is formed from data that is other than imagery data. For example, the virtual scene 670 may include data from sensors such as magnetic, capacitive, RF sensors, or NFC sensors. The NFC sensor may be, for example, a mat that includes several NFC sensors that each may detect a physical object that includes an NFC tag. In some implementations, the digital content 672 of the virtual scene 670 is stored on the electronic storage 613 and is not derived from data received from a sensor or user input.

The representation 674 may be any type of digital or electronic data that is associated with the character 680 by the context engine 660. The representation 674 may be an image or animation that visually resembles the character 680 and is capable of being visually presented to the user of the toy system 610. In some implementations, the representation 674 is a collection of sounds associated with the character 680 that may be aurally presented and heard by a user of the toy system 610. The representation 674 also may have a form that is not amenable to being perceived by the user of the toy system 610. For example, the representation 674 may be a collection of numbers and/or symbols that the context engine 660 associates with the character 680.

The character 680 is associated with a set of the rules 676 by the context engine 660. For example, the electronic storage 613 may include data, such as a look-up table or a database, that associates certain of the rules 676 with particular characters. The set of rules that are associated with a character govern the behavior of that character. When a rule is applied to the electronic representation 674, the representation 674 is modified according to the rule. The rule may be executable logic implemented as, for example, a computer program, that acts on the electronic representation 674 and modifies or changes the electronic representation 674 in accordance with the rule. The rules 676 for a plurality of characters are stored on the electronic storage 613, with particular rules being associated with one or more characters. In other words, each rule may describe a behavior that is associated with a character or with a plurality of characters.

The I/O interface 615 may be any interface that allows a user to communicate with the toy system 610. For example, the I/O interface 615 may be a keyboard, touchscreen, mouse, or another device that accepts tactile input from a user of the system 610, and/or a microphone or other audio interface that accepts aural data. The I/O interface 615 may include a sensor, such as a camera or other type of image sensor, near-field communication (NFC) sensor, a radio-frequency sensor, a capacitive sensor, a magnetic sensor, or any combination of such sensors, and the I/O interface 615 may include more than one such sensor. The sensor may be used to monitor the region near the system 610 and provide data to the system 610 for use in the context engine 660. Additionally, in implementations in which the character 680 is embodied in a physical toy, the I/O interface 615 may receive data from and send data to the physical toy via a data channel 695. The data channel may be a physical link (such as a wired cable connection) or a wireless link (such as a Wi-Fi, infrared, or Bluetooth connection).

In some implementations, the sensor of the I/O interface 615 may image the region near the toy system 610 (for example, a physical play space) and produce an image of a physical toy in the play space. In these implementations, the digital content 672 may include the image of the physical toy, and data from the image sensor may be used to form a digital representation of the physical toy. For example, the physical toy may be detected and identified as a particular physical toy in the image using edge detection, color matching, template matching, or any other technique known in the art. In some implementations, the physical toy includes a unique identifier (for example, a bar code or an RFID tag) that is detected by the I/O interface 615.

Data from the I/O interface 615 is provided to the context engine 660 to identify the toy as a particular toy. The electronic storage 613 stores information (for example, a lookup table or a database) that allows the context engine 616 to associate an identified toy or object with a particular character, type of character, or class of entity.

The I/O interface 615 also may include a device that provides a perceivable output to the user. For example, the I/O interface 615 may include a display that is capable of presenting visual data, such as movies and animations. The I/O interface 615 may include a speaker that produces sounds. Although the I/O interface 615 may include a device capable of providing a perceivable output, in some implementations, the system 610 does not produce a perceivable output and instead may, for example, store any outputs of the context engine 660 as an electronic file.

In some implementations, the I/O interface 615 is a software module the executes instructions that provide data to and/or receive data from the context engine 660. For example, the I/O interface 615 may be a computer program that, when executed, provides the electronic representation 674 of a character to the context engine 660. In these implementations, the I/O interface 615 may download data from a source external to the system 610 and the data may be unrelated to a physical play space in the vicinity of the system 610. For example, the I/O interface 615 may download electronic content from a remote server or website and provide the downloaded content to the context engine 660. In some implementations, the output of the context engine 660 (for example, an updated version of the electronic representation 674) is output, through the I/O interface 615, to a remote server or website. In these implementations, the output of the context engine 660 may be, for example, instructions for a user to construct a new physical scene or a 3-D printed toy based on the modified electronic representation.

In some implementations, the I/O interface 615 may provide the context engine 660 with data that is entirely internal to the system 610 and the I/O interface 615 does not receive data from outside of the toy system 610. For example, the electronic storage 613 may be pre-programmed with digital content 672 at the time of manufacturing. Further, in some implementations, the outputs of the context engine 660 (for example, an updated version of the virtual scene 670 or the electronic representation 674) are not immediately provided outside of the system 610 and are instead stored in the electronic storage 613 for later access by the user of the system 610.

Referring also to FIG. 7, which is a block diagram of an exemplary rule inheritance pattern 700, the context engine 660 drives the behavior of the character 680 based on a set of character rules 781, which are associated with the character 680 and are included the rules 676. The character rules 781 include rules that are inherited from the rules 783 and the rules 785, and may include additional rules or modified versions of the inherited rules. In the pattern 700, the arrows represent patterns of rule inheritance in a character hierarchy. The pattern 700 includes a class of entities 782, which has an associated set of class rules 783. A type of character 784 belongs to the class of entities 782, and the type of character 784 has an associated set of type rules 785. The character 680 belongs to the type of character 784 and the class of entities 782, and the character 680 has the associated set of character rules 781.

An environment 792 may influence the rules associated with any or all of the class of entities 782, the type of character 784, and the character 680. The environment 792 also has a set of associated environment rules 793.

The character 680 is one character of many that belong to the class of entities 782, and the character 680 is also a type of character and belongs to the type of characters 784. The class rules 783 are available to all of the types of characters and characters that belong to the class of entities 782. Each character and type of character that belongs to the class of entities 782 may be considered to inherit the class rules 783 that are available to the class of entities 782. By inheriting the rules 783, the types of characters and the characters are also associated with the rules, and the inherited rules are available (for example, are considered to exist) and may be used to modify electronic representations of the type of character and the character.

For example, the class of entities 782 may be "feline" and the type of character 784 may include "cat", "kitten", "tiger", and "wild great cat." The class rules 783 for the class of entity "feline" may include rules that govern the behaviors "climbing", "pouncing", "sleeping", "roaring", and "growling." Each type of character 784 may inherit these class rules 783 and, thus, representations of the type of character may be capable of performing a behavior based on the class rule 783. However, the behavior resulting from the application of an inherited rule may depend on the type of character. For example, although the "house cat" and the "wild great cat" both inherit the "roaring" rule, applying the "roaring" rule to a "house cat" may result in the context engine 660 causing the "house cat" to meow, whereas applying the "roaring" rule to a character that belonged to the "wild great cat" type would cause the "wild great cat" to emit a large roar.

Particular characters that belong to the type of character 784 may inherit the type rules 785, which are rules that are associated with the type. For example, a character may be a particular cat, which belongs to the "house cat" type of character. The particular cat may produce a certain meow that is unique to the particular cat when the "roaring" rule is applied to an electronic representation of that particular cat.

In addition to behaviors, the rules that are associated with the class of entities 782 may govern other characteristics, such as motion, color, and/or sounds of a character. Further, the rules may be common to more than one class of entities, more than one type of character, and/or more than one character. For example, the "sleeping" rule may be common to any class of entity that includes animals that sleep, and these other classes of entities may have further rules that modify the "sleeping" rule when applied to the animals belonging to that class.

The character 680 may be in an environment 792, which has an associated set of environment rules 793. The rules 781, which are associated with the character 680, the rules 783 and the rules 785, which are rules associated with the class of entities 782 and the type of character 784, respectively, may be informed by the rules 793 of the environment 792. The environment 792 is a surrounding that is distinguished from other surroundings by conditions such as, for example, place (for example, a particular building, city, country, or planet), location (for example, a global positioning system (GPS) coordinate), season of the year, or time of day.

For example, the classes of conditions may include "office buildings", "houses", "cars", "dance clubs", "cities", and "cruise ships". The types of conditions may include "winter", "beach", "day", and "night." The rules associated with the classes of characters, the types of characters, and the particular characters may be informed by the environment 792. For example, the "sleep" rule as applied to the type of character "house cat" may be enhanced to cause the cat to seek out a sunny spot near a window. However, the "sleep" rule as applied to "wild great cat" would not exist with respect to the "house" class of conditions because a "wild great cat" is not generally associated with a house.

Referring to FIG. 8, a flow chart of an example process for context-aware digital play 800 is shown. The process 800 may be performed by the electronic processor 612 of the toy system 610 (FIG. 6). The process 800 may be performed by other toy systems. The process 800 is discussed with respect to the toy system 610.

It is determined that the character 680 is present in the virtual scene 670 (805). The character is determined to be present by analyzing the digital content 672 and determining that the digital content 672 includes an electronic representation of the character 680. The digital content 672 may be data that represents a physical scene sensed by the I/O interface 615. For example, the digital content 672 may include imagery or aural data, or an indication of detection of a unique identifier, collected from the physical scene. The context engine 660 analyzes the data to determine whether the digital content 672 includes an indication or representation of a character. For example, when the digital content 672 includes imagery data, the imagery data may be analyzed using instructions stored on the electronic storage 613 that apply detection and identification techniques such as edge detection or color and shape matching to detect and identify the character 680 in the imagery data.

In another example, the digital content 672 may include an indication associated with a unique RFID or bar code, and the context engine 660 associates the indication with a particular character based on a lookup table or database that is stored on the electronic storage 613.

A context-based stimuli that is related to the virtual scene 670 is accessed (810). The context-based stimuli is an event, action, and/or condition that arises internally to the virtual scene 670 or the system 610 and is related to the virtual scene 670. For example, the context-based stimuli may be a time that has elapsed since the character 680 performed a certain action, or a location of the character 680 relative to virtual objects that are in the virtual scene 670. The context-based stimuli may be accessed from the electronic storage 613, or the stimuli may be received through the I/O interface 615. In examples in which the context-based stimuli is received through the I/O interface 615, the stimuli may be an indication of stimuli that is generated by the system on which the process 800 is executing. For example, the context-based stimuli may be an actual elapsed time that is received from an internal clock of the system.

The rules 676 are queried to determine whether a rule associated with the character 680 and the context-based stimuli exists. The rules 676 may be stored in the electronic storage 613 in association with one or more characters and one or more context-based stimuli. For example, the association may be stored in a database or a lookup table. As discussed above with respect to FIG. 7, the rules 676 may be a set of rules that are associated with the character 680 due to an inheritance pattern such as the pattern 700.

If a rule does not exist, the process 800 returns to determine whether another character is present in the digital content 672 and accesses another context-based stimuli.

If a rule exists, the rule and the context-based stimuli are applied to update the virtual scene 670 (820). Updating the virtual scene 670 may include modifying the digital content 672 and/or modifying the representation 674 in accordance with the rule. The rule governs how the context-based stimuli is applied to the virtual scene 670. For example, if the context-based stimuli is an elapsed time of one month, the rule specifies how to advance the digital content 672 and/or the representation 674 by one month. Thus, if the digital content 672 relates to a late winter scene, the rule modifies the digital content 672 to be an early spring scene.

In some implementations, additional data for updating the virtual scene 670 may be received from an external source (825). The external source may be, for example, a user input received through the I/O interface 615, or data from an additional sensor that is external to the system 610 and communicates with the toy system 610 through the I/O interface 615. The additional data may be information about the physical environment in which the system 610 operates. For example, the additional data may be one or more of a position (such as a GPS coordinate) of the system 610, a location (such as a city or country) of the system 610, a time of day, time of year, day of the week, a temperature at the location of the system 610, a weather condition at the location of the system 610, an indication of the presence of a physical prop in the vicinity of the system 610, or additional electronic content that is downloaded from a remote server or a website.

The character 680 is caused to perform a behavior based on the rule and the stimuli (830). The behavior may be an action that is defined by the rule and the stimuli. Continuing the example above where the context-based stimuli is a one-month advancement in time, the character 680 may be a human-like character that removes their heavy winter coat because the weather has gotten warmer. To cause the character 680 to perform a behavior, the electronic representation 674 is modified based on the rule and the context-based stimuli. For example, if the representation 674 is an animation of the character 680, the animation is modified such that the animated character removes the coat. Thus, in this example, the modified representation has a visual appearance that is distinct from the electronic representation 674.

If additional data is received from the external source (825), the external data also may be used to modify the representation 674. For example, if the weather condition in the vicinity of the system 610 is the external data, and the weather condition is "rainy", the representation 674 may be further modified such that the animation of the character 680 puts on a raincoat. Because the data from the external source may be indicative of the environment in which the system 610 and the user are in, modifying the representation 674 based on the data from the external source may further enhance play value by making a closer connection between the user's environment and the virtual scene 670.

In addition to modifying the representation 674, the data from the external source also may modify the virtual scene 670. Thus, the process may return to (820) to modify the virtual scene 670. Continuing the example above, when the external data indicates a "rainy" condition, the digital content 672 may be modified to include a representation of rain drops and storm clouds.

The process 800 may be applied to and used with physical toys. Referring to FIGS. 9A and 9B, an exemplary physical play space 920 is shown at two different times, with FIG. 9A depicting the physical play space 920 at a first time, and FIG. 9B depicting the physical play space 920 at a second time. The second time occurs after the first time.

The play space 920 includes electromechanical toys 922A, 922B. An electromechanical toy is a toy that includes electrical components (for example, circuitry, electronic processors, and electronic storage) and mechanical components (for example, mechanical linkages, gears, wheels, hinges, and soft materials such as cloth). The electromechanical toy is capable of performing perceivable actions such as, for example, moving and emitting sounds, in response to receiving an appropriate command signal. The electromechanical toy may be an animatronic toy that resembles a living organism, such as a dog or a person, and performs perceivable actions that are consistent with the behavior of the living organism. The electromechanical toy may be a robot that does not necessarily resemble a living organism.

Before discussing the example of FIGS. 9A and 9B, an overview of an exemplary electromechanical toy 922C, which is similar to the toys 922A, 922B, is provided. FIG. 9C is a block diagram of the electromechanical toy 922C. The electromechanical toy 922C includes a communications interface 991, which exchanges data with a system that is external to the electromagnetic toy 922C. For example, the communications interface 991 may exchange data with another electromechanical toy, a smart phone, the mobile device 110 (FIG. 1), the mobile device 210 (FIG. 2), the application 250 (FIG. 5), or the toy system 610 (FIG. 6). The communications interface 991 is any interface that is able to send and/or receive data and may include more than one component. For example, the communications interface 991 may be a wireless transceiver that sends and receives data using the IEEE 802.11 specification. The communications interface 991 also may include a sensor or device capable of receiving tactile input from a user, such as a touch screen or a pressure sensor.

The data received through the communications interface 991 is provided to a controller 992, which controls circuitry 993 and a motion interface 997. The controller 992 may include one or more electronic processors and an electronic storage. The controller 992 controls the circuitry 993 and the motion interface 997 based on the data received from the communications interface 991, causing the toy 992C to perform an action. Thus, the data received at the communications interface 991 may be used to cause the toy 922C to perform a perceivable action.

The circuitry 993 may include one or more of a motion system 994, a sound and light system 995, and a sensing system 996. The motion system 994, the sound and light system 995, and the sensing system 996 may include active electronic components (for example, transistors or operational amplifiers) and passive electronic components (for example, resistors and capacitors). Additionally, the motion system 994 may include components that enable or control the motion of the toy 922C, such as gears and motors. The sound and light system 995 includes components that are capable of making sounds and/or light, such as speakers, ratcheting devices, and light-emitting diodes. The sensing system 996 includes components that are capable of sensing the environment that is external to the toy 922C. For example, the sensing system 996 may include capacitive, magnetic, acoustic, and/or optical sensors.

The toy system also includes the motion interface 997, which is coupled to the motion system 994 and includes components that translate mechanical or electrical energy from the motion system 994 into motion. For example, the motion interface 997 may include one or more wheels. In some implementations, the motion interface 997 is formed to appear as part of the toy 992C. For example, the motion interface 997 may be one or more limbs on an animatronic toy, and the limbs move to move the toy 922C.

The data received at the communications interface 991 may be a control signal from the system 610. The control signal is sufficient to activate the controller 992, the circuitry 993, and/or the motion interface 997 and cause the toy 992C to perform a perceivable action.

Referring again to FIGS. 9A and 9B, the toy system 610 observes the play space 920, and the context engine 660 drives the behavior of the toys 922A and 922B. At the first time, the toy 922A is at the location 1, and the toy 922B is at the location 2. The toy system 610 receives an indication that the toys 922A, 922B are in the space 920. For example, the toys 922A and 922B may include unique identifiers that are sensed by the I/O interface 615 of the toy system 610. In the example of FIGS. 9A and 9B, the virtual scene 670 is any electronic content that represents the play space 920 and the contents of the play space 920. For example, the digital content 672 may include data that was sensed from the play space 920. The context engine 660 identifies the toys 922A, 922B as particular characters from the digital content 672. The digital content 672 is thus determined to include representations of two characters 680. The locations of the toys 922A, 922B in the play space 920 are also determined from the digital content, and the distance between the toys 922A, 922B is a context-based stimuli that is applied to the virtual scene 670. For example, the digital content may include an image of both of the toys 922A, 922B, and the distance between the toys may be determined from the image.

In the example discussed with respect to FIGS. 9A and 9B, the toys 922A, 922B (represented by generic boxes) are two different dogs, "Spot" and "Fluffy", as identified from the digital content 672. However, in other examples, the toys 922A, 922B may have different forms. For example, either or both of the toys 922A, 922B may be an action figure, a robot, and/or an animatronic toy.

"Spot" and "Fluffy" are different characters, but both belong to the same type of character (dogs) and both belong to the same class of entity (canines). Thus, the toys 922A, 922B share common rules, though those rules may be modified based on specific traits of the "Spot" and "Fluffy" characters. In this example, "Spot" is associated with a character rule that indicates that "Fluffy" is a friend. "Fluffy" is associated with a character rule that indicates that "Spot" is a friend. For the dog character type, "friend" status is associated with a rule that causes the character to move closer to the friendly dog. Additionally, both "Fluffy" and "Spot" have a character type rule that indicates that when another dog comes closer than a threshold distance, they will bark.

The context engine 660 determines that the representations of the toys 922A, 922B indicate that the actual toys 922A, 922B are closer than the threshold distance. Thus, toys 922A, 922B should bark at each other and move closer to each other. To cause this behavior, the electronic representation of the toy 922A is modified to indicate that the toy 922A should bark and move in the x direction. The electronic representation of the toy 922B is modified to indicate that the toy 922B should bark and move in the -x direction.

The threshold distance may vary depending on the character. For example, the threshold distance for two dogs that are not friends may be larger than the threshold distance for two dogs that are friends. The threshold distance may be different for different types of animals. In another example, the toys 922A, 922B may represent two action heroes, and the threshold distance may depend on the strength associated with the action hero. For example, a toy associated with Darth Vader may have a very large threshold distance because other characters tend to want to avoid Darth Vader.

The context engine 660 generates a command signal for the toy 922A based on the modified representation of the toy 922A, and a command signal for the toy 922B based on the modified representation of the toy 922B. The system 610 issues the command signals through the data channel 695. The command signal for the toy 922A causes the toy 922A to emit barking sounds and move in the x direction. The command signal for the toy 922B causes the toy 922B to emit barking sounds and move in the -x direction. For example, the command signal may activate the circuitry 993 and/or the motion interface 997, causing the toys 922A and 922B to move and emit sounds.

At the second time shown in FIG. 9B, which is after the command signals have been issued to the toys 922A and 922B, the toys 922A, 922B have moved to the locations 3,4, respectively. The toys 922A, 922B are closer to each other at the second time (FIG. 9B) than at the first time (FIG. 9A). Thus, the physical toys 922A, 922B may be controlled in a context-based manner with the system 610 and the context engine 660.

Referring to FIGS. 10A-10C, an example of the process 800 and the system 610 being used for a mixed physical and virtual experience is shown. FIG. 10A shows a play space 1020 at a first time. At the first time, the play space 1020 includes physical objects 1022A, 1022B, and 1022C. The play space 1020 is monitored by the system 610. In the implementation shown in FIGS. 10A and 10C, the I/O interface 615 includes a sensor (for example, a camera, an NFC sensor, or an RFID reader) that provides data to the context engine 660. The context engine 660 uses the data to determine whether a character is present in the play space 1020. In the example of FIG. 10A, the context engine 660 determines that the play space 1020 includes two types of characters: a car (corresponding to the physical object 1022A) and buildings (corresponding to physical objects 1022B and 1022C).

The context engine 660 accesses a virtual scene that is based on the play space 1020. The virtual scene includes representations of the physical objects 1022A, 1022B, and 1022C. The context engine 660 determines that characters "buildings" and "cars" are present in the virtual scene. In this case, the context-based stimulus is a relative location of the characters, and the context engine 660 also determines the relative location of the representations. The context engine 660 determines that rules exist for "car" and "building" characters, and applies rules to the virtual scene and the representations. In this example, the context engine 660 applies a rule that people should also be in the virtual scene 670 because the car is close to the buildings, implying that the scene is likely a depiction of a downtown or business district. The context engine 660 modifies the virtual scene 670 to also include representations of people. The context engine 660 modifies the electronic representation of the buildings to include additional buildings.

FIG. 10B shows the output of the context engine 660 as visually presented on a display of the system 610. In this example, the output of the context engine 660 is the modified virtual scene and the modified representation of the characters. The modified virtual scene includes additional content 1071 due to the application of rules to the virtual scene. In this example, the additional content 1071 includes people and two additional buildings. By displaying the output of the context engine 660 visually, the system 610 provides a virtual experience that is related to the play space 1020 shown in FIG. 10A.

In addition to presenting the virtual scene at the display as shown in FIG. 10B, the context engine 660 also may present instructions to the user regarding how to construct a physical scene that more closely resembles the virtual scene output by the context engine 660. In some implementations, the output of the context engine 660 may be used to procure 3D printed toys that resemble the additional content of the updated virtual scene. In these implementations, the I/O interface 615 may present a graphical user interface that allows an operator of the system 610 to order 3D printed parts resembling some or all of the additional content.

Referring to FIG. 10C, the system 610 may provide additional enhancements to the contents of the physical play space 1020. FIG. 10C shows the play space 1020 at a time after the output of the context engine 660 is displayed visually. At the time of FIG. 10C, the play space 1020 includes additional physical content added by the user: toy FIG. 1022D and two additional buildings 1022E and 1022F, which are made from construction building bricks. The additional physical content brings the physical scene in the play space 1020 closer to the visually presented virtual scene 1070 (FIG. 10B).

Referring to FIG. 11, a block diagram of the context engine 660 implemented in an example toy figure is shown. In the example of FIG. 11, a virtual scene 1170 is visually presented at a display of a mobile device 1197. The virtual scene 1170 is generated based on the presence of physical objects 1122A-1122D, each of which corresponds to a character, in a physical scene 1120. In the example of FIG. 11, the context engine 660 is implemented in a toy system 1110. The toy system 1110 is a toy figure, such as a Kreon, available from Hasbro, Inc. of Pawtucket, R.I., that has been modified to include hardware and software features similar to those of the toy system 610 (FIG. 6). Thus, the toy system 1110 includes the I/O interface 615, the electronic processor 612, and the context engine 660. In the example of FIG. 11, the I/O interface 615 includes a sensor 1194, which observers a physical scene 1120. The sensor 1194 may be, for example, a camera, a magnetic sensor, a capacitive sensor, an optical sensor, a near-field communication (NFC) reader or sensor, an RFID sensor or reader, or any other type of sensor. The sensor 1194 is associated with a field of view (when the sensor is a camera) or a range (when the sensor is, for example, an NFC reader) that defines the outer boundaries of the physical scene 1120.

The sensor 1194 collects data of the scene, and the data (which forms the digital content 672) includes representations of the physical objects 1122A, 1122B, 1122C, and 1122D. The representations are used to detect the presence of and/or identify characters associated with the physical objects 1122A, 1122B, 1122C, 1122D. For example, the objects 1122A, 1122B, 1122C, and 1122D may have RFID tags that are detected by the sensor 1198 and used to identify the object as a particular object, and the context engine 616 associated the identified physical objects with characters. The characters that the objects 1122A, 1122B, 1122C, 1122D correspond to are a fire pit, shrubs, a tree, and a beach environment, respectively. There is no requirement that the physical object share a visual appearance of the corresponding character. For example, the object 1122B does not exactly resemble a shrub, but may have a detectable unique identifier that indicates that the object 1122B corresponds to a shrub character.

The context engine 660 generates an updated virtual scene by modifying the electronic representations of the characters and/or the digital content that includes the representations of the characters. Additionally, context-based stimuli from within the virtual scene may be used to update the virtual scene or the electronic representation of the characters. In the example of FIG. 11, the proximity of the tree object 1122C to the beach environment object 1122D is determined from the representations of these two objects. Because the physical objects 1122C and 1122D are in close proximity, a rule that is associated with the tree character is modified by rules that govern the beach environment. The proximity and the rule modify the electronic representation of the tree into a palm tree 1199. In another example, the proximity of the fire pit object 1122A to the beach environment object 1122D causes a rule that is associated with the fire pit object 1122A to be modified by a rule that governs the beach environment, resulting in the electronic representation of the fire pit being modified to include an animation of flames.

In some implementations, the system 1110 receives inputs from an external source that indicate conditions of the surroundings of the system 1110, such as weather conditions, time of year, and time of day. The weather conditions may be used to further modify the virtual scene or the electronic representations. For example, if the external input indicates that the weather in the vicinity of the system 1110 is "rainy" then the electronic representation of the fire pit is not modified to include the animation of flames.

FIGS. 12A, 12B, and 13 show block diagrams of exemplary stands that may be used to hold a mobile device that runs the application 250 or an application that implements the process 800. When used with a mobile device that runs the application 250 or an application that implements the process 800, the stand forms an interactive toy system suitable for use by a child.

Referring to FIGS. 12A and 12B, front and side block diagrams, respectively, of an exemplary stand 1205 are shown. The stand 1205 includes a holder 1240 that receives and holds a mobile device 1210. The holder 1240 is supported at a distance 1247 in the z direction relative to a base 1206 by a pedestal 1245. The base 1206 defines a play space 1221 where a user may place physical or real-world objects (such as the toy cat 322 discussed above) that are used to create a digital play experience that is visually presented on a display 1211 of the mobile device 1210. The holder 1240 is adjustable and may hold mobile devices of a variety of sizes and form factors securely in a fixed position.

To use the stand 1205, the user places the mobile device 1210 in the holder 1240 with the display 1211 in the x-z plane. The user's gaze is in the y direction, facing the display 1211 and the play space 1221. Thus, the stand 1205 supports the mobile device 1210 with the display 1211 oriented toward the user and the play space 1221 open to the user. As a result, the user may view the display 1211 of the mobile device 1210 while playing with physical objects, such as a toys, in the play space 1221.

The mobile device 1210 includes an imaging sensor 1214, which may be, for example, a camera. The imaging sensor 1214 has a field of view 1257, which is a solid angle through which the imaging sensor 1214 is sensitive to light. The stand 1205 also may include an optical assembly 1250 that receives light from the play region 1221 and provides the light to the sensor 1214, defining an optical path between the play region 1221 and the sensor 1214.

The optical assembly 1250 includes one or more optical components, such as mirrors, lenses, and/or prisms, to steer light from the play region 1221 to the image sensor 1214 along the optical path. The optical path may include bends and portions that are not in the z direction. Thus, the optical path may be longer than the distance 1247. Because the cross-sectional area of the field of view increases with distance from the imaging sensor 1214, by providing an optical path that causes the light to traverse a greater physical length, the entire base 1206 may be in the field of view 1257 of the sensor 1214 without increasing the distance 1247. By maintaining a close spacing in the z direction between the base 1206, which is where the user places and plays with toys in the play space 1221, and the holder 1240, which is where the toys are represented in a virtual scene shown on the display 1211 of the mobile device 1210, the stand 1205 allows the user to feel a more real and a closer interplay between the activities of the play space 1221 and the virtual play world shown at the mobile device 1210.

Additionally, the optical assembly 1250 centers the field of view 1257 of the sensor 1214 at the center of the base 1206 regardless of where the holder 1240 positions the sensor 1214 relative to the base 1206. Thus, the optical assembly 1250 allows the imaging sensor 1214 to be held relative to the base 1206 at a position other than directly above the center of the base 1206. Because the imaging sensor 1214 of the mobile device 1210 is not necessarily located to coincide with the center of mass of the mobile device 1210, by not requiring that the optical path be entirely in the z direction, the optical assembly allows the stand 1205 to be balanced when the mobile device 1210 is held in the stand.

Referring to FIG. 13, a block diagram showing another exemplary stand 1305 is shown. The stand 1305 includes a holder 1340 that receives a mobile device that includes an image sensor 1314, with mobile devices 1310a and 1310b shown for illustration. The mobile device rests in the holder 1340. The holder 1340 includes sides 1342a, 1342b, 1342c that hold the mobile device at the perimeter of the mobile device, partially or completely surrounding the perimeter of the mobile device. The holder 1340 holds the mobile device securely and without obscuring the image sensor 1314. At least one of the sides 1342a, 1342b, 1342c is adjustable and may move relative to the other sides to change the size of the holder to accommodate a particular mobile device. For example, the side 1342c slides in the x direction to hold the smaller mobile device 1310b. Any of the sides 1342a, 1342b, 1342c may be adjustable, and a portion of a side may be adjustable. For example, the side 1342b may have a tray or lip that pulls out in the y direction to accommodate the mobile device.

The stand 1305 also includes a pedestal 1345 that supports the holder 1340 a distance 1347 in the z direction above a base 1306. The base 1306 is a play surface that defines a play space 1321 where a user of the stand 1305 places physical objects for use in a context-aware digital play application (such as the application 250 discussed above).

To use the stand 1305, the user places the mobile device in the holder 1340 with the display of the mobile device in the x-z plane. The user's gaze is in the y direction, facing the display and the play space 1321. Thus, the stand 1305 supports the mobile device with the display oriented toward the user and the play space 1321 open to the user. As a result, the user may view the display of the mobile device while playing with physical objects, such as a toys, in the play space 1321. The distance 1347 may be such that the user may sit while using the stand 1305.

The stand 1305 also includes an optical assembly 1350 that centers the field of view of the image sensor 1314 at the center of the base 1306. The optical assembly 1350 includes two plane mirrors 1352, 1353 that define an optical path 1351 through which light from the play space 1321 travels to the image sensor 1314. Together, the mirrors 1352, 1353 shift the center of the field of view of the image sensor 1314 from an original location 1355 to the center of the base 1306. By shifting the center of the field of view, the optical assembly 1350 allows the mobile device to be held in positions where the image sensor 1314 is not directly above the center of the base 1306. In this manner, the mobile device may be placed in the holder 1340 in such a way that the weight of the mobile device does not cause the stand 1305 to become unbalanced. Additionally, the optical assembly 1350 allows the distance 1347 between the holder 1340 and the base 1306 to be reduced compared to an implementation that lacks the optical assembly 1350 without compromising on image quality. The camera of the mobile device has a generally fixed field of view.

Referring to FIGS. 14A and 14B, another exemplary optical assembly 1450 is shown. The optical assembly 1450 may be used with the stand 1205 or the stand 1305 and is discussed with respect to the stand 1305.

The optical assembly 1450 includes three plane mirrors 1452, 1453, 1454 that, when used with the stand 1350, are positioned between the sensor 1314 of the mobile device 1310 and the base 1306 instead of the mirrors 1351 and 1353 (FIG. 13). As compared to an assembly with fewer mirrors, the optical assembly 1450 may use smaller mirrors and may have a smaller overall footprint. The use of smaller mirrors may provide additional space in the vicinity of the base 1306, providing a larger play space 1321 and more room for the child to play. Further, the use of additional mirrors also may increase the distance of an optical path 1451, and this may allow further reduction in the distance 1347 between the camera 1314 and the base 1306 while still allowing the field of view of the image sensor 1314 to cover the entire base 1306.

Referring to FIG. 15, a partial perspective view of the optical assembly 1450 as mounted in the stand 1305 is shown. The optical assembly 1450 is mounted on a slider 1460 that allows the mirrors 1454 and 1452 of the optical assembly 1450 to move in the x direction. This allows the user of the stand 1305 to adjust the optical assembly 1450 so that the stand 1305 is optimized to work with a particular mobile device. In some implementations in which the stand 1305 is used with the context-aware application 250, the application 250 may include a calibration procedure that aids the user in adjusting the optical assembly 1450.

In the examples of above, the stand 1205 and 1305 is shown as being horizontal (in the x-y plane). However, the stand 1205 and 1305 may be oriented at an angle relative to the x-y plane.

Other implementations are within the scope of the following claims. For example, the context-aware digital play system 260 or the context engine 660 may be implemented as an expert system that may emulate or approximate the decision-making of a human through an inference engine that applies rules to known facts, events, or collected data to determine an updated virtual scene and/or modifications to a virtual object.

The toy system 610 may be implemented in any type of physical hardware. For example, the toy system 610 may be implemented in a mobile device, such as a smart phone or a tablet. The toy system 610 may be implemented as a beacon device that has a form conducive for a child to position near a physical play space. The toy system 610 may be implemented as part of a toy that is in physical toy space and interacts with other toys. The toy system 610 may be implemented on a remote server that is not in the vicinity of a physical toy play space. The toy system 610 may be implemented in a toy such as the toys 922A or 922B.

Additionally, the toy system 610 may be a distributed system. For example, the electronic storage 613 of the toy system may reside in a physical object that is separate from the other components of toy system 610 but in communication with the toy system 610. For example, the electronic storage 613 and/or the I/O interface 615 of the toy system 610 may reside in a physical toy, such as in the controller 992 of the toy 922A or 922B.

The application 250 or the process 800 may be used to create content, such as stories, movies, and digital games from the virtual scene. Aspects of these stories, such as, for example, character animations and environments, may be predetermined but also may be augmented to provide uniqueness, surprise and delight during each play session (for example, during each execution of the application 250 or the process 800). For example, the past actions of a virtual object or character may be stored in the scene state database 266 or the electronic storage 613 to allow the virtual object or character to appear to retain a consciousness of what they have done in the past and try to "change it up" in subsequent acting sessions. For example, prior behaviors of the virtual object may be stored as an attribute of the virtual object in the scene state database 266 of the electronic storage 213.

In another example, certain real-world props may offer randomized digital results in the application 250 or the process 800, adding an element of surprise, intrigue and discovery. For example, a prop could be a gift box physical object. When the virtual gift object is opened in the virtual scene, the contents of the gift box may be different every time, while the physical toy is always a physical gift box. A finite number of possible contents of the virtual gift box object digital results may be stored as attributes of the virtual gift box object in the scene state database 266.

In some implementations, procedural alterations to the character and background animations may be stored in the scene state database 266 or the electronic storage 613 and applied to virtual objects to create an illusion of realistic development or time passing rather than a prescribed, looping animation that plays on command. For example, a head-tilt in the idle animation of a virtual object may include an additive rotational variable which, each time the animation is triggered, sets to a randomized value within a set range, causing the head of the virtual object head to tilt more, less, or the same each time.

Further, the application 250 or the process 800 may establish a connection between the physical toys and the virtual scene. For example, physical play with toys is typical to analog "make-believe" playing, with the digital experience being "real," informed by the physical play. Additionally, the application 250 and the process 800 may provide a "phygital" experience (for example, an experience with physical and digital or virtual aspects) in which the user feels as though they have agency in the digital experience through their physical interactions, with digital interactions occurring or being delivered through physical play. Moreover, the application 250 and the process 800 also may provide a "digital" experience, such as by visually displaying the virtual scene at the mobile device 210 even in the absence of input from the user or data from a sensor. The application 250 and the process 800 continuously serve to entertain the user, whether a user is actively participating through physical play or passively viewing movie content.

Although the application 250 and the process 800 may execute in the absence of data from a sensor, the application 250 and the process 800 also may process data from a sensor to detect and identify a physical object (such as a toy). In implementations of the application 250 and the process 800 that use data from a sensor (such as the image sensor 114 on the mobile device 110), a foreground analysis approach may be applied to data from the sensor to detect a change in the data collected by the sensor. A change in the data from the sensor may indicate, for example, that a real-world object is in the field of view of the sensor or that a real-world object that was present has moved or is no longer in the field of view of the sensor. An example implementation of a foreground analysis technique with a sensor, such as a camera, that collects image data of the real-world object is discussed below.

The foreground analysis approach may analyze the data from the sensor by performing a per-pixel color-field analysis over a variable area subsection and variable sample time to separate and/or identify foreground objects relative to an underlying background. The foreground analysis may include a variable pixel area analysis and/or a limited object recognition range.

The foreground analysis may include a variable pixel area analysis, which allows different operations to be performed in any given area subsection of the data from the sensor. In some implementations, boundaries for a particular type of analysis are presented visually on at the device that includes the sensor (such as at the display 111 of the mobile device 110). The user places content for analysis in the field of view of the camera and positions the camera by hand using the visually presented boundaries. Different methods of analysis may be applied in different area subsections simultaneously.

The foreground analysis also may include a limited object recognition range technique. In this technique, after a foreground object has been analyzed, one of several known approaches may be applied to identify the object from a finite set of targets. The approaches may include, for example, an analysis on red-green-blue (RGB) color channels, a determination of whether infrared light is present, or a detection of a shape of the object using, for example, edge detection.

The foreground analysis may begin with an initial background detection that defines the initial state of the background in the data from the sensor. Changes to that initial background are detected subsequently by comparing current sensor data to the initial background.

A Hue-Saturation-Brightness (HSB) metric or value may be determined. The initial background is analyzed to extract hue, saturation and brightness (HSB) data to use a reference later in the system. This HSB data is referred to as the initial HSB data. Next, a difference operation is performed. In a given subsection of the data from the sensor, the foreground elements are separated by looking for changes between the initial background data and new (or current) data from the sensor. If no difference is detected, the system waits a time and then performs the same operation again looking for new foreground changes. These changes may be detected per pixel or by an averaged section of several pixels. Detecting the changes per pixel may include determining a value (for example, an HSB value) associated with each pixel in a current image from the sensor and a previous image from the sensor. The determined values associated with each pixel in the current image and the corresponding pixel in the previous image are compared, by, for example, subtraction. A change may be detected based on the results of the comparison. The detection also may be performed using an averaged section of pixels, which compares the average value associated with several pixels instead of the value associated with individual pixels.

If the magnitude of the difference is greater than a threshold, a foreground element (for example a physical toy on a background) is deemed to be detected or present. If a foreground element is deemed to be detected, the application 250 or the process 800 may improve the quality of the user experience or make assumptions to guard against corruption or drop-outs in the data from the sensor. For example, the application 250 or the process 800 may make the assumption that a single red pixel in a large field of blue pixels is an unwanted artifact not eligible for object recognition and purge the field of pixels or the pixel, removing it from the detected foreground objects. The assumptions may be stored as heuristics in the electronic storage 213 or the electronic storage 613.

Next, the data may be corrected for HSB. Using the initial HSB Data (discussed above), the application 250 or the process 800 may perform color correction on the foreground object for the purpose of accurately analyzing the foreground data.

If a foreground object has been detected, the application 250 or the process 800 may perform data analysis to recognize the object or identify the object as a particular class of entity, type of character, or particular character. This analysis may determine features of the detected foreground object, for example, the RGB values of the pixels associated with the object, the presence of infrared light, and/or the shape of the detected foreground object. The foreground object and/or the features of the foreground object are compared with a finite set of targets. When a match is found, the application 250 or the process 800 may then perform any number of actions, including determining that a change to the background has occurred. In that instance, initial background data may be redefined. Otherwise, the application 250 or the process 800 continues to analyze the data from the sensor for new foreground content.

What is claimed is:

1. A method for context-aware digital play, the method comprising:
    accessing a virtual scene, the virtual scene comprising digital content;
    determining that the digital content of the virtual scene comprises a representation of at least one of a plurality of characters, each of the characters being associated with rules, wherein the rules associated with each of the characters are pre-set prior to accessing the virtual scene, do not change during the context-aware digital play, and are related to a known behavior of the character with which the rule is associated;
    accessing an indication of one or more context-based stimuli, the context-based stimuli being based on the virtual scene;
    determining whether one or more of the rules associated with the character are also associated with the one or more context-based stimuli that are associated with the accessed indication; and
    if one or more of the rules are determined to be associated with the context-based stimuli, applying the context-based stimuli to the virtual scene by updating the digital content of the virtual scene based on the one or more rules and modifying the representation of the character based on the one or more rules.

2. The method of claim 1, wherein modifying the representation of the character based on the one or more rules comprises causing the character to perform an action defined by at least one of the one or more rules.

3. The method of claim 2, wherein causing the character to perform an action defined by at least one of the one or more rules comprises visually presenting the modified representation of the character on a screen of an electronic device, the modified representation having a perceivable distinction from the representation of the character.

4. The method of claim 3, wherein the modified representation of the character comprises an animation of the character that changes visually over time.

5. The method of claim 1, further comprising:
    generating a command signal based on the modified representation of the character, the command signal being sufficient to cause a perceivable change in a physical object, and
    providing the command signal to the physical object such that the physical object performs a perceivable action determined by the command signal.

6. The method of claim 5, wherein the perceivable action comprises one or more of motion, production of sound, and a change in color.

7. The method of claim 1, wherein the virtual scene further comprises a representation of at least one object, and the method further comprises determining a location of the character relative to the representation of any of the objects in the virtual scene from the digital content.

8. The method of claim 1, wherein the indication of one or more context-based stimuli comprises an indication of one or more of an elapsed time, a distance between the character and an object in the virtual scene, and accessing an indication of the context-based stimuli comprises receiving an indication of the context-based stimuli.

9. The method of claim 8, wherein the indication of the context-based stimuli is received from an electronic system that performs the method for context-aware digital play.

10. The method of claim 1, further comprising:
    detecting a first physical object;
    identifying the first detected physical object as a first character of the plurality of characters;
    detecting a second physical object; and
    identifying the second physical object as a second character of the plurality of characters, wherein:
        determining that the digital content of the virtual scene comprises a representation of at least one of the characters comprises determining that the digital content of the virtual scene comprises a representation of the first character and the second character, and
        accessing an indication of one or more context-based stimuli comprises determining a distance between the first physical character and the second physical character from the representation of the first physical object and the representation of the second physical object, and comparing the determined distance to a threshold.

11. The method of claim 10, further comprising:
    generating a command signal based on the comparison; and
    providing the command signal to one or more of the first physical object and the second physical object, the command signal being sufficient to cause either or both of the first physical object and the second physical object to perform an action defined by the command signal.

12. The method of claim 11, wherein at least one of the first physical object and the second physical object is an animatronic toy.

13. The method of claim 10, wherein the threshold is a value that is associated with one or more of the first character and the second character.

14. The method of claim 10, wherein the first and second characters are different types of characters.

15. The method of claim 10, wherein the first and second characters are two instances of the same type of character.

16. The method of claim 1, further comprising receiving an input from an external source, and wherein, if one or more of the rules are determined to also be associated with the context-based stimuli, the virtual scene is updated based on the one or more rules and the input from the external source.

17. The method of claim 16, wherein the input from an external source comprises one of more of an indication of a position, a location, a time of year, a time of day, a day of the week, an indication of a presence of a physical prop in a physical play space, and electronic content.

18. The method of claim 1, further comprising:
    detecting a physical object; and
    identifying the physical object as a particular object, wherein the digital content of the virtual scene is based on the identified physical object.

19. The method of claim 1, wherein accessing a virtual scene comprises accessing, at a mobile device positioned relative to a real-world scene, the virtual scene, the virtual scene being based on the real-world scene, the representation of at least one of a plurality of characters comprising a first virtual object and a second virtual object;
    the method further comprises: determining, at the mobile device and based on the accessed virtual scene, that the first virtual object and the second virtual object interact; and wherein
        accessing an indication of one or more context-based stimuli comprises retrieving an attribute associated with the accessed virtual scene from a database stored on a computer-readable medium of the mobile device, and selecting, from a range of possible modifications stored in the database, a modification of the first virtual object, the selected modification being associated with the retrieved attribute in the database;

selecting the modification comprises determining that a rule exits; and applying the context-based stimuli to the virtual scene comprises applying, at the mobile device, the selected modification to the first virtual object to form a modified first virtual object; and the method further comprises: presenting, at the mobile device, an updated virtual scene, the updated virtual scene comprising the modified first virtual object.

20. The method of claim 19, wherein presenting the updated virtual scene comprises visually presenting the updated virtual scene at the mobile device.

21. The method of claim 19, wherein determining that the first virtual object and the second virtual object interact comprises determining whether any part of the first virtual object and the second virtual object coincide spatially.

22. The method of claim 19, wherein the range of modifications stored in the database comprises at least one modification that, when applied to the first virtual object, causes the first virtual object to be modified such that, when visually presented, the modified first virtual object is visually distinct from the first virtual object.

23. The method of claim 19, wherein
the first virtual object is associated with a real-world object in the real-world scene, and
the attribute associated with the accessed virtual scene comprises a characteristic of the real-world object associated with the first virtual object.

24. The method of claim 19, further comprising:
receiving data representing the real-world scene from a sensor; and
modifying the accessed virtual scene based on the data from the sensor.

25. The method of claim 1, wherein at least one of the plurality of characters is further associated with one or more procedural attributes that are changeable during the context-aware digital play.

26. A toy system for context-aware digital play, the system comprising:
an input/output interface;
an electronic processor; and
a non-transitory computer-readable storage medium coupled to the electronic processor, the computer-readable medium having stored thereon instructions that, when executed by the electronic processor, cause the electronic processor to:
access a virtual scene, the virtual scene comprising digital content;
determine that the digital content of the virtual scene comprises a representation of at least one of a plurality of characters, each of the characters being associated with rules, wherein the rules associated with each of the characters are pre-set prior to accessing the virtual scene, do not change during the context-aware digital play, and are related to a known behavior of the character with which the rule is associated;
access an indication of one or more context-based stimuli, the context-based stimuli being based on the virtual scene;
determine whether one or more of the rules associated with the character are also associated with the one or more context-based stimuli that are associated with the accessed indication indications; and
if one or more of the rules are determined to be associated with the context-based stimuli, apply the context-based stimuli to the virtual scene by updating digital content of the virtual scene based on the one or more rules and modifying the representation of the character based on the one or more rules.

27. The toy system of claim 26, wherein the input/output interface comprises an imaging sensor; the imaging sensor, the electronic processor, and the computer-readable medium of the toy system are part of a mobile device; and the toy system further comprises:
a stand comprising:
a holder configured to receive and hold the mobile device, the holder comprising a movable portion;
a base configured to receive a toy;
a pedestal configured to support the holder at a distance from the base; and
an optical assembly comprising at least one optical element, the optical assembly arranged to center a field of view of the imaging sensor of the mobile device at a center of the base when the mobile device is in the holder.

28. The toy system of claim 27, wherein the optical assembly is movable relative to the base.

29. The toy system of claim 26, wherein the toy system is embodied as a toy figure.

30. The toy system of claim 29, wherein the input/output interface comprises one or more of an optical sensor, an imaging sensor, a camera, a near-field communication sensor, a radio-frequency sensor, a capacitive sensor, and a magnetic sensor.

31. The toy system of claim 30, wherein the input/output interface further comprises a communications link capable of sending and receiving data.

32. A method for context-aware digital play, the method comprising:
accessing a virtual scene, the virtual scene comprising digital content;
determining that the digital content of the virtual scene comprises a representation of at least one of a plurality of characters, each of the characters being associated with rules;
accessing an indication of one or more context-based stimuli, the context-based stimuli being based on the virtual scene;
determining whether one or more of the rules associated with the character are also associated with the context-based stimuli;
if one or more of the rules are associated with the context-based stimuli, applying the context-based stimuli to the virtual scene by updating the digital content of the virtual scene based on the one or more rules and modifying the representation of the character based on the one or more rules;
detecting a first physical object;
identifying the first detected physical object as a first character of the plurality of characters;
detecting a second physical object; and
identifying the second physical object as a second character of the plurality of characters, wherein:
determining that the digital content of the virtual scene comprises a representation of at least one of the characters comprises determining that the digital content of the virtual scene comprises a representation of the first character and the second character, and accessing an indication of one or more context-based stimuli comprises determining a distance between the first physical character and the second physical character from the representation of the first physical object and the representation of the second physical object, and comparing the determined distance to a threshold.

33. A toy system for context-aware digital play, the system comprising:
a mobile device; and
a stand comprising:
  a holder configured to receive and hold the mobile device, the holder comprising a movable portion;
  a base configured to receive a toy;
  a pedestal configured to support the holder at a distance from the base; and
  an optical assembly comprising at least one optical element, the optical assembly arranged to center a field of view of a imaging sensor of the mobile device at a center of the base when the mobile device is in the holder, wherein
the mobile device comprises:
  an input/output interface comprising the imaging sensor;
  an electronic processor;
  a non-transitory computer-readable storage medium coupled to the electronic processor, the computer-readable medium having stored thereon instructions that, when executed by the electronic processor, cause the electronic processor to:
    access a virtual scene, the virtual scene comprising digital content;
    determine that the digital content of the virtual scene comprises a representation of at least one of a plurality of characters, each of the characters being associated with rules;
    access an indication of one or more context-based stimuli, the context-based stimuli being based on the virtual scene;
    determine whether one or more of the rules associated with the character are also associated with the context-based stimuli that are associated with the accessed indication; and
    if one or more rules are associated with the context-based stimulo, apply the context-based stimuli to the virtual scene by updating digital content of the virtual scene based on the one or more rules and modifying the representation of the character based on the one or more rules.

* * * * *